(12) United States Patent
Miyoshi

(10) Patent No.: US 10,445,095 B2
(45) Date of Patent: Oct. 15, 2019

(54) INFORMATION PROCESSING DEVICE, COMPILER METHOD, AND RECORDING MEDIUM RECORDING COMPILER PROGRAM

(71) Applicant: FUJITSU LIMITED, Kawasaki-shi, Kanagawa (JP)

(72) Inventor: Takahiro Miyoshi, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 14 days.

(21) Appl. No.: 15/993,658

(22) Filed: May 31, 2018

(65) Prior Publication Data

US 2018/0365013 A1 Dec. 20, 2018

(30) Foreign Application Priority Data

Jun. 15, 2017 (JP) .................... 2017-117897

(51) Int. Cl.
*G06F 9/30* (2018.01)
*G06F 8/41* (2018.01)

(52) U.S. Cl.
CPC ........ *G06F 9/30061* (2013.01); *G06F 8/4443* (2013.01); *G06F 9/30123* (2013.01)

(58) Field of Classification Search
CPC ....... G06F 9/30; G06F 8/4443; G06F 9/30061
USPC ......................................................... 717/140
See application file for complete search history.

(56) References Cited

U.S. PATENT DOCUMENTS

2015/0089149 A1* 3/2015 Kimura ............... G06F 12/0862
711/137

FOREIGN PATENT DOCUMENTS

JP 4-278632 10/1992
JP 10-312291 11/1998

* cited by examiner

*Primary Examiner* — John Q Chavis
(74) *Attorney, Agent, or Firm* — Fujitsu Patent Center

(57) ABSTRACT

An information processing device includes: a memory; and a processor coupled to the memory, the processor specifies a function including a branch instruction including one or more branch destinations in a program code; determines, based on a first number of arguments which are referenced in one branch destination among the one or more branch destinations, whether or not an argument of one function obtained by functionalizing the one branch destination are passable through a register; and converts, when determining to be passable, the specified function using one or more functions obtained by functionalizing the one or more branch destinations and does not convert, when determining not to be passable, the specified function.

20 Claims, 20 Drawing Sheets

FIG. 4

400 func_def : FUNCTION DEFINITION INFORMATION
caller_point : CALLER
called_in_loop : WHETHER FUNCTION IS CALLED IN A LOOP
const_arg_num : NUMBER OF CONSTANTS DESIGNATED AS ACTUAL ARGUMENTS
increase_obj_size : INCREASE IN OBJECT SIZE DUE TO FUNCTIONALIZATION
next : NEXT FUNCTION INFORMATION

FIG. 5

500 switch_arg : INDEX OF ARGUMENT REFERENCED IN switch STATEMENT
com_arg_num : NUMBER OF ARGUMENTS REFERENCED ONLY IN COMMON PROCESS
com_arg_list : INDEX LIST OF ARGUMENTS REFERENCED ONLY IN COMMON PROCESS
arg_info_in_case : ARGUMENT INFORMATION IN case STATEMENT

FIG. 6

600 case_value : VALUE OF case STATEMENT
case_arg_num : NUMBER OF ARGUMENTS REFERENCED ONLY IN PROCESS OF case STATEMENT
case_arg_list : INDEX LIST OF ARGUMENTS REFERENCED ONLY IN PROCESS OF case STATEMENT
next : NEXT INFORMATION

```
int main ( ) {
  ...
  sub1 (a, b, c)
  for (int i = 0; i < n; ++i) {
    ...
    sub2 (d, 3, f, i, g);
    ...
    sub3 (h, j, k, 2);
  }
  ...
  sub2 (l, m, n, o);
  return 0;
}
```

```
void sub1 (x, y, z) {
  ...
}
void sub2 (x, y, z, w, v) {
  switch (w) {
    // case 1 ONLY REFERENCES x
    case 1 : PROCESS X
    // case 3 ONLY REFERENCES y
    case 3 : PROCESS Y
    // case 5 ONLY REFERENCES z
    case 5 : PROCESS Z
  }
  // NO REFERENCES TO x, y, z
  // REFERENCE TO v
  COMMON PROCESS
}
```

```
void sub3 (x, y, z, w) {
  switch (x) {
    case 2 : ...
    case 4 : ...
    case 7 : ...
  }
}
```

US 10,445,095 B2

INFORMATION PROCESSING DEVICE, COMPILER METHOD, AND RECORDING MEDIUM RECORDING COMPILER PROGRAM

CROSS-REFERENCE TO RELATED APPLICATION

This application is based upon and claims the benefit of priority of the prior Japanese Patent Application No. 2017-117897, filed on Jun. 15, 2017, the entire contents of which are incorporated herein by reference.

FIELD

The embodiment discussed herein is related to an information processing device, a compiler method, and a recording medium recording a compiler program.

BACKGROUND

In compiling technology, object code in a computer-executable format is generated based on source code in which the processing content of software is stated in a programming language, and an executable file that realizes the software is generated.

Related technology is disclosed in Japanese Laid-open Patent Publication No. 10-312291 or Japanese Laid-open Patent Publication No. 4-278632.

For example, at the time of optimization, if the processing content of case statements is functionalized, handling arguments on the stack may cause an increase in the access time to the arguments.

For example, an information processing device that attempts to improve software execution performance may be provided.

SUMMARY

According to an aspect of the embodiments, an information processing device includes: a memory; and a processor coupled to the memory, the processor specifies a function including a branch instruction including one or more branch destinations in a program code; determines, based on a first number of arguments which are referenced in one branch destination among the one or more branch destinations, whether or not an argument of one function obtained by functionalizing the one branch destination are passable through a register; and converts, when determining to be passable, the specified function using one or more functions obtained by functionalizing the one or more branch destinations and does not convert, when determining not to be passable, the specified function.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates an exemplary data structure of function information;
FIG. 5 illustrates an exemplary data structure of argument information;
FIG. 6 illustrates an exemplary data structure of case statement information;
FIG. 7 illustrates exemplary program code.

DESCRIPTION OF EMBODIMENT

For example, to potentially improve software execution performance, object code is generated after modifying the processing content stated in the source code, to an extent that does not change the functionality of the software.

For example, in a case in which the argument of a target function of inline expansion is evaluated to be a constant as a result of optimization, if the cost of the optimized target function using the value of the optimized argument is lower than the cost of calling the target function, the target function is inlined. For example, the configuration, structure, variables, and the like of a module are analyzed, and the configuration, structure, variables, and the like of the module are converted or reconfigured.

Figure 1:
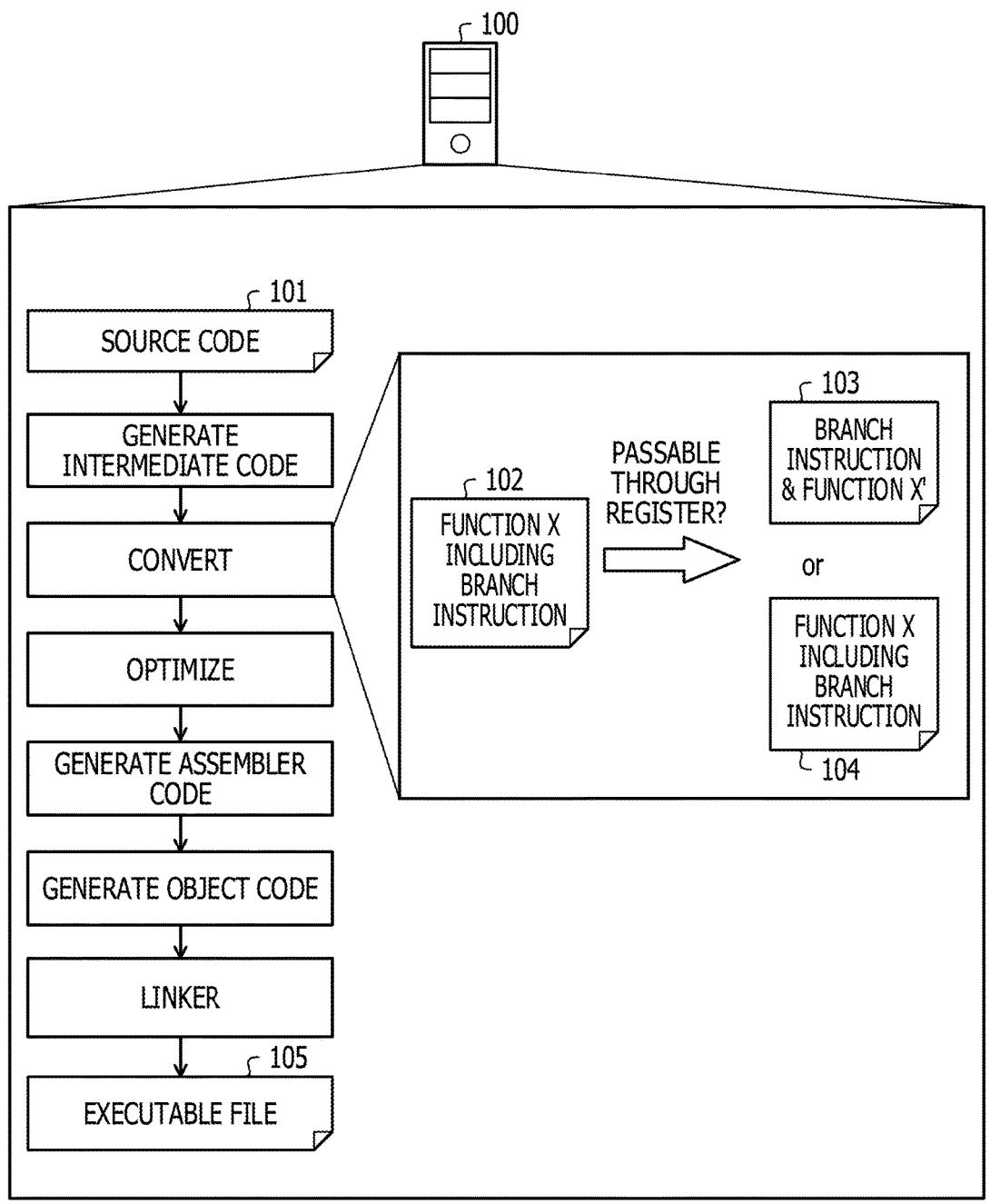
FIG. 1 illustrates an exemplary compiling method.

FIG. 1 illustrates an exemplary compiling method. An information processing device 100 is a computer that compiles source code and generates object code. The information processing device 100 is a server, a personal computer (PC), a notebook PC, a tablet, a smartphone, a wearable terminal, or the like, for example.

The source code is a file in which the processing content of software is stated in a programming language. The programming language is C or C++, for example. The programming language may also be a language other than C or C++, for example. In the source code, branch instructions such as switch-case statements or if-else statements may be stated. The object code is a file in a computer-executable format.

At the time of compiling, optimization may be executed. Optimization is technology that attempts to improve software execution performance by generating object code after modifying the processing content stated in the source code, to an extent that does not change the functionality of the software. For example, at the time of optimization, by functionalizing the processing content of case statements and simplifying the data dependence analysis, the software execution performance is improved.

For example, at the time of optimization, improving the software execution performance may be difficult in some cases. For example, at the time of optimization, if the processing content of case statements is functionalized, arguments may be handled on the stack in memory, rather than in a register. Therefore, during execution of the software, arguments are read in or read out with respect to the stack in memory which has poorer access efficiency than the register, which may lead to increased access times to the arguments, and improving the software execution performance may be difficult.

For example, as a result of optimization, the size of the object code may increase. For example, at the time of optimization, a number of functions that functionalize the processing content of a case statement is created in proportion to the number of case statements, and the size of the object code generated after optimization may increase.

For example, even if optimization is performed, reducing the memory resources used by the software may be difficult in some cases. For example, an argument x of a function that includes a switch-case statement may be referenced in the processing content A of a certain case statement, but may not be referenced in the processing content B of another case statement. In this case, when calling the function, memory resources are consumed by the passing of the argument x, even if the processing content A is not executed.

For example, a compiler method that attempts to improve software execution performance may be provided in which, at the time of optimization, a function that includes a switch-case statement is selectively substituted with a function obtained by functionalizing the processing content of the switch-case statement and the case statements.

In FIG. 1, the information processing device 100 acquires source code 101. In the source code 101, a function that includes a branch instruction is stated, for example. The branch instruction is a switch-case statement, an if-else statement, or the like, for example.

The switch-case statement includes a switch statement stating a branch determination, and case statements stating the processing content of the branches. The switch-case statement additionally may include a common process. In the example of FIG. 1, for the sake of simplicity, the switch-case statement is assumed not to include a common process.

(1-1) The information processing device 100 analyzes the source code 101, and generates intermediate code 102. In the intermediate code 102, a function that includes a branch instruction is stated, similarly to the source code 101. The branch instruction is a switch-case statement, an if-else statement, or the like, for example.

(1-2) The information processing device 100 selectively converts the function that includes a branch instruction in the generated intermediate code 102. First, the information processing device 100 specifies the function that includes a branch instruction in the intermediate code 102, for example. The information processing device 100 specifies a function X that includes a switch-case statement in the intermediate code 102, for example. With this arrangement, the information processing device 100 specifies a function as a conversion candidate, enabling a determination regarding whether or not to convert the function.

For example, the information processing device 100 may specify a function that includes a branch instruction. For example, the information processing device 100 may specify a function that includes a branch instruction and also satisfies a designated condition.

For example, based on the number of arguments referenced in each branch of the branch instruction included in the specified function, the information processing device 100 determines whether or not the arguments of functions obtained by functionalizing each branch are passable through the register. For example, the information processing device 100 determines whether or not the arguments of functions obtained by functionalizing the processing content of each case statement of a switch-case statement included in the function X are passable through the register.

For example, in the case of determining that the arguments of the functions obtained by functionalizing each branch are passable through the register, the information processing device 100 uses the functions obtained by functionalizing each branch to convert the specified function, and acquires intermediate code 103. For example, in the case of determining that the arguments of the functions obtained by functionalizing the processing content of each case statement are passable through the register, the information processing device 100 converts the function X that includes the switch-case statement, and acquires the intermediate code 103. The function X that includes the switch-case statement is converted by substituting in a function obtained by functionalizing the processing content of the switch-case statement and the case statements, for example.

For example, in the case of determining that an argument of a function obtained by functionalizing any branch is not passable through the register, the information processing device 100 does not convert the specified function, and acquires intermediate code 104. For example, in the case of determining that an argument of a function obtained by functionalizing the processing content of any case statement is not passable through the register, the information processing device 100 does not convert the function X that includes the switch-case statement, and acquires the intermediate code 104. With this arrangement, the information processing device 100 makes it possible to execute optimization of the intermediate code 103 or the intermediate code 104.

In the case of determining that the arguments of the functions obtained by functionalizing each branch are passable through the register, the information processing device 100 may convert the specified function. For example, in the case of determining that an argument of a function obtained by functionalizing at least one branch is passable through the register, the information processing device 100 may convert the specified function. For example, in the case of determining that the arguments of the functions obtained by functionalizing each of a designated number of branches or more are passable through the register, the information processing device 100 may convert the specified function. In this case, in the case of determining that none of the arguments of the functions obtained by functionalizing the branches is passable through the register, the information processing device 100 may not convert the specified function.

In the case of determining that an argument of a function obtained by functionalizing any branch is not passable through the register, the information processing device 100 may not convert the specified function. For example, in the case of determining that the size of the object code would increase by a fixed amount or greater if the specified function is converted, the information processing device 100 may not convert the specified function.

(1-3) The information processing device 100 executes optimization of the intermediate code 103 or the intermediate code 104.

(1-4) The information processing device 100 generates assembler code based on the optimized intermediate code 103 or intermediate code 104.

(1-5) The information processing device 100 generates object code based on the generated assembler code.

(1-6) The information processing device 100 uses a linker to generate an executable file 105 based the generated object code. With this arrangement, the information processing device 100 potentially improves the execution performance of the software realized by the executable file 105 while restraining increases in the size of the object code, and also restraining increases in the size of the executable file 105 as a result.

For example, during execution of the software realized by the executable file 105, the information processing device 100 restrains increases in the number of times arguments are written to or read from the stack in memory, which has poorer access efficiency than the register. Therefore, the information processing device 100 is able to restrain increases in argument access times, and potentially improve the execution performance of the software.

Since the specified function is not converted in the case of determining that the argument is not passable, the information processing device 100 restrains increases in the size of the object code, and restrains increases in the size of the executable file 105 generated based on the object code.

For a dummy argument which is referenced in a function that includes a branch instruction but not referenced in one of the branches, the information processing device 100 may not reference the dummy argument in the function obtained by functionalizing one of the branches, and reduce the memory resources used to pass arguments. A dummy argument is an argument used when defining a function. In contrast, an argument used when calling a function is called an actual argument.

The information processing device 100 may also cause a branch instruction to not be included in the functions obtained by functionalizing each branch. Therefore, the information processing device 100 is able to potentially simply the data dependence analysis in the functions obtained by functionalizing each branch, and make it easier to improve the execution performance of the software through optimization.

The information processing device 100 may also convert the specified function in the case in which the arguments of functions obtained by functionalizing each of a designated number of branches among the multiple branches are passable through the register rather than multiple branches. Therefore, in the case in which the number of transitions to branches whose arguments are passable through the register is greater than the number of transitions to branches whose arguments are not passable through the register, the information processing device 100 is able to make it easier to improve the execution performance of the software.

In FIG. 1, the information processing device 100 acquires the source code 101. Another case is possible in which, for example, the information processing device 100 acquires the intermediate code 102 from another computer, and selectively converts the function that includes a branch instruction in the intermediate code 102.

In FIG. 1, the information processing device 100 generates object code and the executable file 105 from the intermediate code 102. Another case is possible in which, for example, the information processing device 100 outputs the intermediate code 102 to another computer, and causes the other computer to create the object code and the executable file 105 from the intermediate code 102.

In FIG. 1, the information processing device 100 selectively converts the function that includes a branch instruction in the intermediate code 102. Another case is possible in which, for example, before converting the source code 101 to the intermediate code 102, the information processing device 100 selectively converts the function that includes a branch instruction in the source code 101.

Figure 2:
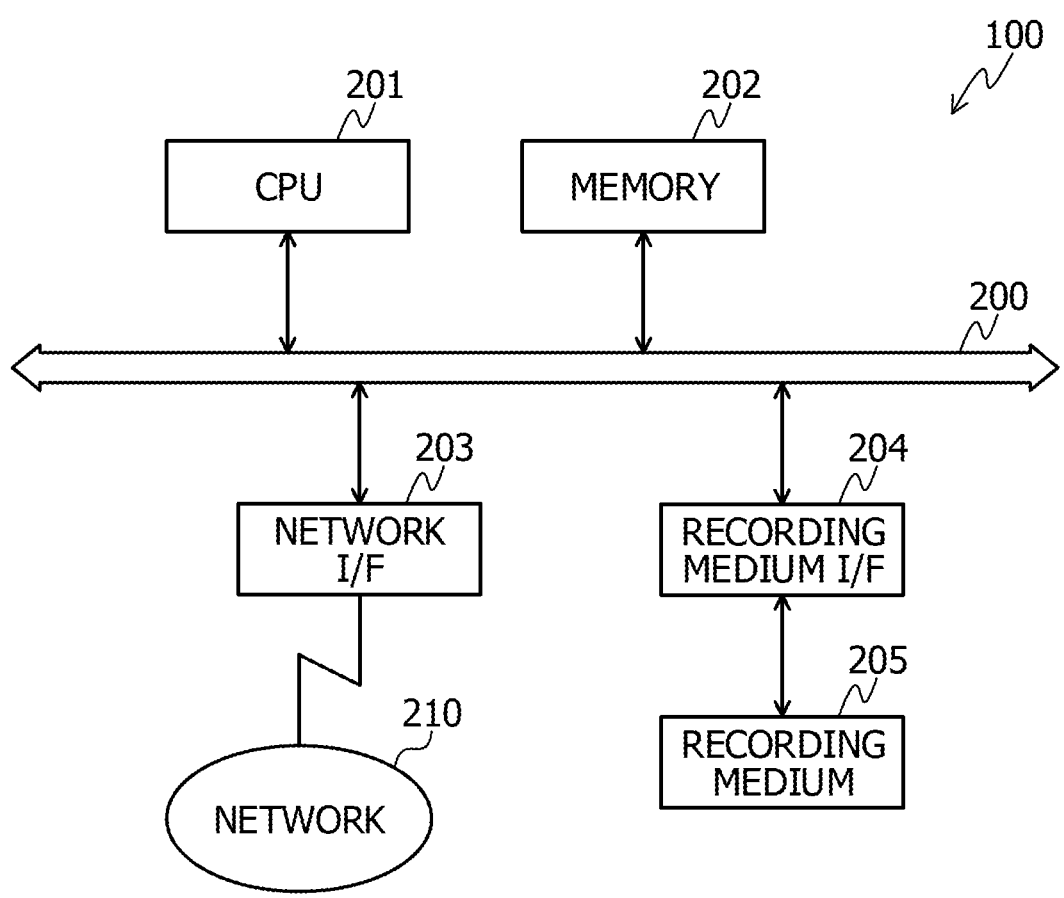
FIG. 2 illustrates an exemplary hardware configuration of the information processing device.

FIG. 2 illustrates an exemplary hardware configuration of the information processing device. In FIG. 2, the information processing device 100 includes a central processing unit (CPU) 201, memory 202, a network interface (I/F) 203, a recording medium I/F 204, and a recording medium 205. The respective components are coupled to each other by a bus 200.

The CPU 201 administers control of the information processing device 100 as a whole. The memory 202 may include read-only memory (ROM), random access memory (RAM), flash ROM, and the like, for example. For example, the flash ROM and ROM store various programs, while the RAM is used as a work area of the CPU 201. A program stored in the memory 202 is loaded by the CPU 201, thereby causing the CPU 201 to execute a process coded therein.

The network I/F 203 is coupled to a network 210 via a communication link, and is coupled to another computer over the network 210. The network I/F 203 administers the internal interface with the network 210, and controls the input and output of data from other computers. For the network I/F 203, a mode, a local area network (LAN) adapter, or the like may be adopted, for example.

The recording medium I/F 204 controls the reading/writing of data with respect to the recording medium 205, under control by the CPU 201. The recording medium I/F 204 is a disk drive, a solid-state drive (SSD), a Universal Serial Bus (USB) port, or the like, for example. The recording medium 205 is non-volatile memory that stores data written under the control of the recording medium I/F 204. The recording medium 205 is a disk, semiconductor memory, USB memory, or the like, for example. The recording medium 205 may also be removable from the information processing device 100.

Besides the components described above, the information processing device 100 may also include a keyboard, a mouse, a display, a printer, a scanner, a microphone, a speaker, and the like, for example. The information processing device 100 may also not include the recording medium I/F 204 and the recording medium 205.

Figure 3:
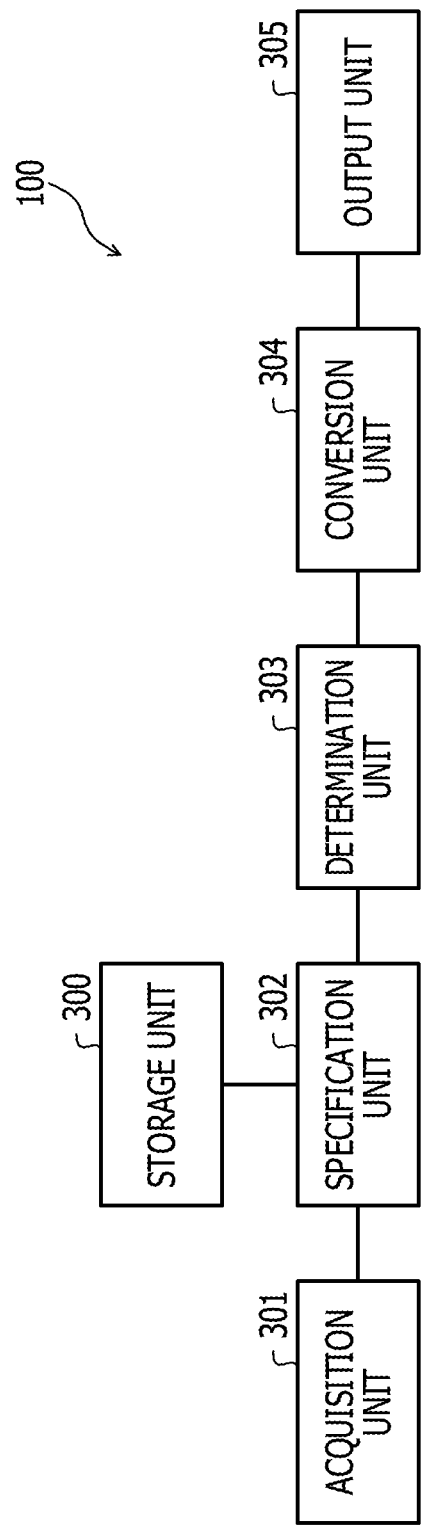
FIG. 3 illustrates an exemplary functional configuration of the information processing device.

FIG. 3 illustrates an exemplary functional configuration of the information processing device. The information processing device 100 includes a storage unit 300, an acquisition unit 301, a specification unit 302, a determination unit 303, a conversion unit 304, and an output unit 305.

The storage unit 300 is realized by a storage area such as the memory 202 or the recording medium 205 illustrated in FIG. 2, for example. The acquisition unit 301 to the output unit 305 are functions that act as a control unit. The functions of the acquisition unit 301 to the output unit 305 are realized by causing the CPU 201 to execute a program stored in a storage area such as the memory 202 or the recording medium 205 illustrated in FIG. 2, or are realized by the network I/F 203, for example. The processing result of each functional unit is stored in a storage area such as the memory 202 and the recording medium 205 illustrated in FIG. 2, for example.

The storage unit 300 stores first to seventh conditions used when the specification unit 302 specifies a function. The storage unit 300 stores function information described later in FIG. 4, argument information described later in FIG. 5, and case statement information described later in FIG. 6. With this arrangement, the storage unit 300 enables each functional unit to reference the first to seventh conditions, the function information described later in FIG. 4, the argument information described later in FIG. 5, the case statement information described later in FIG. 6, and the like.

The acquisition unit 301 acquires program code. The program code is a file stating the processing content of software, for example. The program code is intermediate code generated based on source code, for example. The acquisition unit 301 acquires the intermediate code generated based on the source code, based on operation input by a user. With this arrangement, the acquisition unit 301 enables each functional unit to reference the program code.

The specification unit 302 specifies one or more functions that include a branch instruction in the program code acquired by the acquisition unit 301. The specification unit 302 specifies one or more functions that include a switch-case statement in the intermediate code, for example. With this arrangement, the specification unit 302 causes the determination unit 303 to reference a function as a conversion candidate.

The specification unit 302 may also specify a function that includes a branch instruction and also satisfied a designated condition in the program code acquired by the acquisition unit 301. The designated condition includes a condition set by the user, based on a viewpoint regarding whether or not a function is related to the improvement of software execution performance, for example.

The designated condition includes a condition set by the user, based on a viewpoint regarding whether or not the size of the object code increases by a fixed amount or greater as a result of converting the function in the conversion unit 304, for example. The designated condition includes a condition set by the user, based on a viewpoint regarding whether or not the function is convertible in the conversion unit 304 given the specifications of the programming language. The designated condition includes at least one of the first to seventh conditions below, for example.

The first condition is, for example, the existence of an argument which is not referenced in each of the branches of a branch instruction included in a function, but is referenced in the branch determination of the branch instruction included in the function. The first condition indicates that the number of arguments of functions obtained by functionalizing each branch included in the function that satisfies the first condition is less than the number of arguments of the function that satisfies the first condition. Therefore, the first condition indicates that, in the case of converting the function that satisfies the first condition in the conversion unit 304, memory resources used by the software potentially may be saved, and the software execution performance potentially may be improved. The first condition may be used to avoid an increase in the processing load on the determination unit 303 due to causing the determination unit 303 to reference, as a conversion candidate, a function which does not satisfy the first condition, and which is judged to have little relevance to the improvement of software execution performance.

The first condition may also be, for example, the existence of an argument which is not referenced in each of the branches of a branch instruction included in a function, is not referenced in the common process of the function, but is referenced in the branch determination of the branch instruction included in the function.

The second condition is that, for example, the caller of the function exists inside the same translation unit. The translation unit is a file unit. The translation unit is an intermediate code unit, for example. The second condition indicates that even in the case in which IPO is not used due to the specifications of the programming language, if the function satisfies the second condition, the function is convertible in the conversion unit 304. Therefore, the second condition may be used to avoid an increase in the processing load on the determination unit 303 due to causing the determination unit 303 to reference, as a conversion candidate, a function which does not satisfy the second condition, and which is not convertible in the conversion unit 304.

The third condition is that, for example, the function is not called recursively. The third condition indicates that, given the specifications of the programming language, a function satisfying the third condition is convertible in the conversion unit 304. Therefore, the third condition may be used to avoid an increase in the processing load on the determination unit 303 due to causing the determination unit 303 to reference, as a conversion candidate, a function which does not satisfy the third condition, and which is not convertible in the conversion unit 304.

The fourth condition is that the function does not call another user-defined function. The fourth condition indicates that, given the specifications of the programming language, a function satisfying the fourth condition is convertible in the conversion unit 304. Therefore, the fourth condition may be used to avoid an increase in the processing load on the determination unit 303 due to causing the determination unit 303 to reference, as a conversion candidate, a function which does not satisfy the fourth condition, and which is not convertible in the conversion unit 304.

The fifth condition is that the function does not include exception handling. The fifth condition indicates that, given the specifications of the programming language, a function satisfying the fifth condition is convertible in the conversion unit 304. Therefore, the fifth condition may be used to avoid an increase in the processing load on the determination unit 303 due to causing the determination unit 303 to reference, as a conversion candidate, a function which does not satisfy the fifth condition, and which is not convertible in the conversion unit 304.

The sixth condition is that the number of instructions included in the function is a threshold value or less. The sixth condition indicates that, as a result of converting a function satisfying the sixth condition in the conversion unit 304, the size of the object code is determined not to increase by a fixed amount or greater. Therefore, the sixth condition may be used to avoid converting a function that does not satisfy the sixth condition in the conversion unit 304, and causing the size of the object code to increase by a fixed amount or greater. Also, the sixth condition may be used to avoid causing the determination unit 303 to reference, as a conversion candidate, a function which does not satisfy the sixth condition, and which, if converted in the conversion unit 304, is determined to cause the size of the object code to increase by a fixed amount or greater. Therefore, the sixth condition may be used to avoid an increase in the processing load on the determination unit 303.

The seventh condition is that at least a subset of the arguments of the function is passed through the stack. The seventh condition indicates that if a function satisfying the seventh condition is converted in the conversion unit 304, and a subset of the arguments are made to go through the register instead of going through the stack, an increase in the access times to the subset of the arguments may be reduced, and the software execution performance may be improved potentially. The seventh condition may be used to avoid an increase in the processing load on the determination unit 303 due to causing the determination unit 303 to reference, as a conversion candidate, a function which does not satisfy the seventh condition, and which is judged to have little relevance to the improvement of software execution performance.

The specification unit 302 specifies a function that satisfies the first condition, for example. The specification unit 302 specifies, for example, a function containing an argument which is not referenced in the case statements, not referenced in the common process, but is referenced in the switch statement. With this arrangement, the specification unit 302 is able to specify a function relevant to the improvement of software execution performance as a conversion candidate, and not specify a function judged to have little relevance to the improvement of software execution performance as a conversion candidate.

As a result, the specification unit 302 causes the determination unit 303 to reference a function relevant to the improvement of software execution performance as a conversion candidate, and potentially improves the software execution performance. The specification unit 302 reduces the occurrence of causing the determination unit 303 to reference a function judged to have little relevance to the improvement of software execution performance, and increasing the processing load on the determination unit 303.

The specification unit 302 specifies a function that satisfies the second condition, for example. The specification unit 302 specifies, for example, a function whose caller exists inside the same translation unit. With this arrangement, the specification unit 302 reduces the occurrence of causing the determination unit 303 to reference a function which is not convertible in the conversion unit 304 as a conversion candidate, and increasing the processing load on the determination unit 303.

The specification unit 302 specifies a function that satisfies the third condition, for example. The specification unit 302 specifies, for example, a function which is not called recursively. With this arrangement, the specification unit 302 reduces the occurrence of causing the determination unit 303 to reference a function which is not convertible in the conversion unit 304 as a conversion candidate, and increasing the processing load on the determination unit 303.

The specification unit 302 specifies a function that satisfies the fourth condition, for example. The specification unit 302 specifies, for example, a function which does not call a user-defined function. With this arrangement, the specification unit 302 reduces the occurrence of causing the determination unit 303 to reference a function which is not convertible in the conversion unit 304 as a conversion candidate, and increasing the processing load on the determination unit 303.

The specification unit 302 specifies a function that satisfies the fifth condition, for example. The specification unit 302 specifies, for example, a function that does not include exception handling. With this arrangement, the specification unit 302 reduces the occurrence of causing the determination unit 303 to reference a function which is not convertible in the conversion unit 304 as a conversion candidate, and increasing the processing load on the determination unit 303.

The specification unit 302 specifies a function that satisfies the sixth condition, for example. The specification unit 302 specifies, for example, a function having a number of instructions which is a threshold value or less. With this arrangement, the specification unit 302 reduces the occurrence of causing a function with a number of instructions greater than the threshold value to be converted in the conversion unit 304, and increasing the size of the object code by a fixed amount or greater. The specification unit 302 reduces the occurrence of causing the determination unit 303 to reference, as a conversion candidate, a function which, if converted in the conversion unit 304, is determined to cause the size of the object code to increase by a fixed amount or greater. Therefore, the specification unit 302 reduces the occurrence of increasing the processing load on the determination unit 303.

The specification unit 302 specifies a function that satisfies the seventh condition, for example. The specification unit 302 specifies, for example, a function in which at least a subset of the arguments is passed through the stack. With this arrangement, the specification unit 302 causes a function in which at least a subset of the arguments is passed through the stack to be converted in the conversion unit 304, thereby causing the subset of the arguments to go through the register instead of going through the stack, restraining an increase in the access times to the subset of the arguments, and potentially improving the software execution performance. The specification unit 302 reduces the occurrence of causing the determination unit 303 to reference, as a conversion candidate, a function in which a subset of the arguments is passed through the register, and which is determined to have little relevance to the improvement of the software execution performance. Therefore, the specification unit 302 reduces the occurrence of increasing the processing load on the determination unit 303. The specification unit 302 stores the specified result in the storage unit 300 using function information or the like described later in FIG. 4.

Based on the number of arguments referenced in at least one of the branches of the branch instruction included in the function specified by the specification unit 302, the determination unit 303 determines whether or not the arguments of a function obtained by functionalizing at least one branch are passable through the register. For example, the determination unit 303 collects argument information described later in FIG. 5, case statement information described later in FIG. 6, and the like. The determination unit 303 determines that the arguments are passable in the case in which the number of arguments referenced in the processing content of at least one case statement of the switch-case statement included in the specified function, minus constant arguments, is less than or equal to an upper limit on arguments passable through the register. With this arrangement, when a function including a branch instruction is converted in the conversion unit 304, the determination unit 303 determines whether or not the software execution performance may be improved.

Based on the number of arguments referenced in each of the branches of the branch instruction included in the function specified by the specification unit 302, the determination unit 303 determines whether or not the arguments of a function obtained by functionalizing each branch are passable through the register. For example, the determination unit 303 collects argument information described later in FIG. 5, case statement information described later in FIG. 6, and the like. The determination unit 303 determines that the arguments are passable in the case in which the number of arguments referenced in the processing content of each case statement of the switch-case statement included in the specified function, minus constant arguments, is less than or equal to an upper limit on arguments passable through the register. With this arrangement, when a function including a branch instruction is converted in the conversion unit 304, the determination unit 303 determines whether or not the software execution performance may be improved.

In the case in which the determination unit 303 determines that the arguments of a function obtained by functionalizing at least one branch are passable through the register, the conversion unit 304 uses the functions obtained by functionalizing each branch to convert the function specified by the specification unit 302. In the case in which the determination unit 303 determines that the arguments of a function obtained by functionalizing any branch are not passable through the register, the conversion unit 304 does not convert the function specified by the specification unit 302.

For example, the conversion unit 304 collects argument information described later in FIG. 5, case statement information described later in FIG. 6, and the like. In the case of determining that the arguments are register-passable for at least one case statement, the conversion unit 304 uses the functions obtained by functionalizing the processing content of each case statement of the switch-case statement to convert the function that includes the switch-case statement. In the case of determining that the arguments are not register-passable for any case statement, the conversion unit 304 does not convert the function that includes the switch-case statement. For example, in the case of determining that the arguments are not register-passable for each case statement, the conversion unit 304 may be configured not to convert the function that includes the switch-case statement. With this arrangement, the conversion unit 304 converts a function that includes a branch instruction in the case in which the software execution performance may be improved.

In the case in which the determination unit 303 determines that the arguments of the functions obtained by functionalizing each branch are passable through the register, the conversion unit 304 uses the functions obtained by functionalizing each branch to convert the function specified by the specification unit 302. On the other hand, in the case in which the determination unit 303 determines that the arguments of a function obtained by functionalizing any branch are not passable through the register, the conversion unit 304 does not convert the function specified by the specification unit 302.

For example, the conversion unit 304 collects argument information described later in FIG. 5, case statement information described later in FIG. 6, and the like. In the case of determining that the arguments are register-passable for each case statement, the conversion unit 304 uses the functions obtained by functionalizing the processing content of each case statement of the switch-case statement to convert the function that includes the switch-case statement. For example, in the case of determining that the arguments are not register-passable for any case statement, the conversion unit 304 does not convert the function that includes the switch-case statement. With this arrangement, the conversion unit 304 converts a function that includes a branch instruction in the case in which the software execution performance may be improved.

From the size of the object code based on the program code, the conversion unit 304 computes an index value indicating the degree of increase in the size of the object code based on the program code in the case of converting the specified function. For example, the conversion unit 304 computes the degree of increase in the size of the object code based on the program code after conversion with respect to the size of the object code based on the program code before conversion as the index value. With this arrangement, in the case of converting the specified function, the conversion unit 304 evaluates the magnitude of the probability that the size of the object code will be increased by a fixed amount or greater.

For every function specified by the specification unit 302, the conversion unit 304 computes the increase in the size of the object code based on the program code in the case of using the functions obtained by functionalizing each branch of the branch instruction included in the function to convert the function. With this arrangement, in the case of converting the specified function, the conversion unit 304 evaluates how much the size of the object code is increased.

The conversion unit 304 may also not convert the specified function in the case in which the computed index value is a threshold value or greater. With this arrangement, the conversion unit 304 is able to restrain increases in the size of the object code.

The conversion unit 304 may also select multiple functions specified by the specification unit 302 in accordance with a designated rule, compute the index value for every selection, and not convert, among the multiple functions specified by the specification unit 302, a function whose computed index value is the threshold value or greater.

For example, the conversion unit 304 selects multiple functions specified by the specification unit 302 sequentially so that a function called in a loop process is selected first, and a function not called in a loop process is selected last. With this arrangement, the conversion unit 304 decides whether or not to convert functions in order of the functions which are highly relevant to the improvement of the software execution performance while also restraining increases in the size of the object code, thereby potentially improving the software execution performance efficiently.

For example, the conversion unit 304 selects multiple functions specified by the specification unit 302 sequentially in order of the largest number of constants designated as arguments. With this arrangement, the conversion unit 304 decides whether or not to convert functions in order of the functions which are highly relevant to the improvement of the software execution performance while also restraining increases in the size of the object code, thereby potentially improving the software execution performance efficiently.

For example, the conversion unit 304 selects multiple functions specified by the specification unit 302 sequentially in order of the functions with the lowest computed increase. With this arrangement, the conversion unit 304 decides whether or not to convert functions in order of the functions for which increases in the size of the object code are easily restrained, thereby restraining increases in the size of the object code efficiently.

The conversion unit 304 does not convert the specified function in the case in which the size of the object code based on the program code in the case of converting the specified function using the functions obtained by functionalizing each branch is a threshold value or greater. With this arrangement, the conversion unit 304 is able to restrain increases in the size of the object code.

In the case in which the conversion unit 304 does not convert the function, the determination unit 303 may be configured not to determine whether or not the arguments of the functions obtained by functionalizing each branch are passable through the register. With this arrangement, the processing load on the determination unit 303 may be reduced.

The output unit 305 outputs the conversion result of the conversion unit 304. The output unit 305 may output the processing result of each functional unit. The output format is, for example, display on a display, printed output on a printer, transmission to an external device via the network I/F 203, or storage in a storage area such as the memory 202 or the recording medium 205.

Function information 400 is realized by a storage area such as the memory 202 or the recording medium 205 of the information processing device 100 illustrated in FIG. 2, for example.

FIG. 4 illustrates an exemplary data structure of function information. As illustrated in FIG. 4, the function information 400 includes func_def, caller_point, called_in_loop, const_arg_num, increase_obj_size, and next fields.

The func_def field is function definition information. The caller_point field is identification information that identifies the caller of the function. The called_in_loop field is flag information that indicates whether or not the function is called in a loop process. The const_arg_num field is the number of constants designated as actual arguments of the function. The increase_obj_size field is the increase in the size of the object code in the case of functionalizing the processing content of the case statements included in the function. The next field is a pointer to the next function information 400.

Argument information 500 is realized by a storage area such as the memory 202 or the recording medium 205 of the information processing device 100 illustrated in FIG. 2, for example.

FIG. 5 illustrates an exemplary data structure of argument information. As illustrated in FIG. 5, the argument information 500 includes switch_arg, com_arg_num, com_arg_list, and arg_info_in_case fields.

The switch_arg field is an index of an argument referenced in the switch statement. The com_arg_num field is the number of arguments referenced only in the common process of the function that includes the switch-case statement. The com_arg_list field is an index list of arguments referenced only in the common process of the function that includes the switch-case statement. The arg_info_in_case field is a pointer to case statement information 600 for arguments referenced inside a case statement.

The case statement information 600 is realized by a storage area such as the memory 202 or the recording medium 205 of the information processing device 100 illustrated in FIG. 2, for example.

FIG. 6 illustrates an exemplary data structure of the case statement information. As illustrated in FIG. 6, the case statement information 600 includes case_value, case_arg_num, case_arg_list, and next fields.

The case_value field is a case statement value that identifies the case statement. The case_arg_num field is the number of arguments referenced only in the processing content of the case statement. The case_arg_list field is an index list of the arguments referenced only in the processing content of the case statement. The next field is a pointer to the next case information.

FIG. 7 illustrates exemplary program code. As illustrated in FIG. 7, a main function is stated in the program code 700, for example. The main function calls three functions sub1, sub2, and sub3.

A switch-case statement is not stated in sub1. A switch-case statement is stated in sub2 sub3. The caller of sub1 and the caller of the second instance of sub2 do not exist in a loop process. The caller of the first instance of sub2 and the caller of sub3 exist in a loop process.

In the following description, the caller of sub1 is described "caller_sub1" in some cases. In the following description, the caller of the first instance of sub2 is described "caller_sub2_A", and the caller of the second instance of sub2 is described "caller_sub2_B" in some cases. In the following description, the caller of sub3 is described "caller_sub3" in some cases.

For the dummy arguments x, y, z, w, and v of sub2, x is referenced only in the process of case1, y is referenced only in the process of case3, z is referenced only in the process of case5, v is referenced only in the common process, and w is referenced only in the switch statement.

Figure 8:
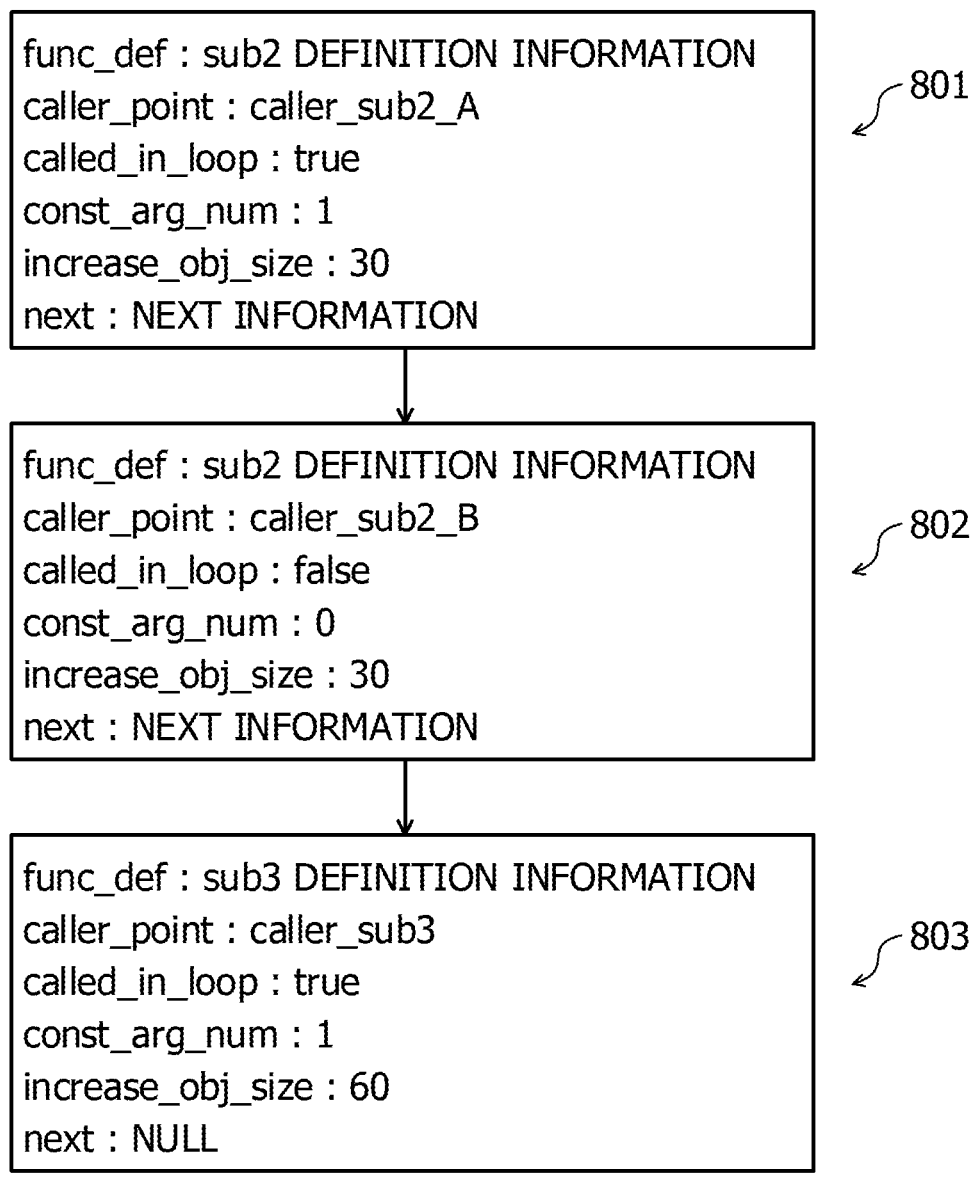
FIG. 8 illustrates exemplary program code conversion.

FIGS. 8 to 11 illustrate exemplary program code conversion. In FIG. 8, the information processing device 100 searches for the existence of a function including a switch-case statement in the program code 700, and if such a function exists, registers the function name of the function including a switch-case statement in a function candidate list candidates.

The function sub1 does not include a switch-case statement, but the functions sub2 and sub3 include switch-case statements. Therefore, the information processing device 100 registers sub2 and sub3 in candidates, and sets candidates={sub2, sub3}.

The information processing device 100 determines whether or not the functions whose function names are registered in candidates satisfy the first to seventh conditions described earlier. The criterion of whether the arguments of a function go through the register or go through the stack is different depending on the application binary interface (ABI). Herein, it is assumed that the arguments go through the register if there are less than four, and go through the stack if there are four or more. Also, herein, the number of instructions in each function whose function name is registered in candidates is assumed to be a threshold value or less. In this case, the information processing device 100 determines that sub2 and sub3 whose function names are registered in candidates satisfy the first to seventh conditions, and does not remove sub2 and sub3 from candidates.

The information processing device 100 generates a function information list info_list based on candidates. In the example of FIG. 8, the function information list info_list includes function information 801 to 803 as function information info.

For example, the information processing device 100 prepares a pointer f to a function whose function name is registered in candidates, and prepares a pointer p to the caller of f. First, the information processing device 100 sets the pointer f to the function to sub2, and sets the pointer p to the caller of sub2 to caller_sub2_A. The information processing device 100 prepares function information 801 for sub2.

In the function information 801, the information processing device 100 sets func_def to sub2 definition information, and sets caller_point to caller_sub2_A indicated by the pointer p to the caller of sub2. Herein, caller_sub2_A is called in a loop process, and a single constant is designated as an argument. Therefore, in the function information 801, the information processing device 100 sets called_in_loop to true, and sets const_arg_num to 1.

Next, the information processing device 100 sets caller_sub2_B to the pointer p to the caller of sub2. The information processing device 100 prepares function information 802 about sub2, and sets next in the function information 801 about sub2 to a pointer to the prepared function information 802.

In the function information 802, the information processing device 100 sets func_def to sub2 definition information, and sets caller_point to caller_sub2_B indicated by the pointer p to the caller of sub2. Herein, caller_sub2_B is not called in a loop process, and a constant is not designated as an argument. Therefore, in the function information 802, the information processing device 100 sets called_in_loop to false, and sets const_arg_num to 0.

Additionally, since no callers of sub2 exist other than caller_sub2_A and caller_sub2_B, the information processing device 100 updates the point f to the function to sub3, and sets the pointer p to the caller of sub3 to caller_sub3. The information processing device 100 prepares function information 803 about sub3, and sets next in the function information 802 about sub2 to a pointer to the prepared function information 803.

In the function information 803, the information processing device 100 sets func_def to sub3 definition information, and sets caller_point to caller_sub3 indicated by the pointer p to the caller of sub3. Herein, caller_sub3 is called in a loop process, and a single constant is designated as an argument. Therefore, in the function information 803, the information processing device 100 sets called_in_loop to true, and sets const_arg_num to 1.

For example, since increase_obj_size depends on the source code, the information processing device 100 analyzes the source code, and sets increase_obj_size to 30 for sub2, and sets increase_obj_size to 60 for sub3.

For example, in the case of a reduced instruction set computer (RISC), since the instruction word length is fixed in RISC, the information processing device 100 computes the increase in the size of the object code for a function according to increase=(instruction word length)×(total number of instructions in function). Also, for example, in the case of a complex instruction set computer (CISC), since the instruction word length is variable in CISC, the information processing device 100 computes the increase in the size of the object code for a function by adding together the instruction word length of each instruction inside the function. Next, the description will refer to FIG. 9.

Figure 9:
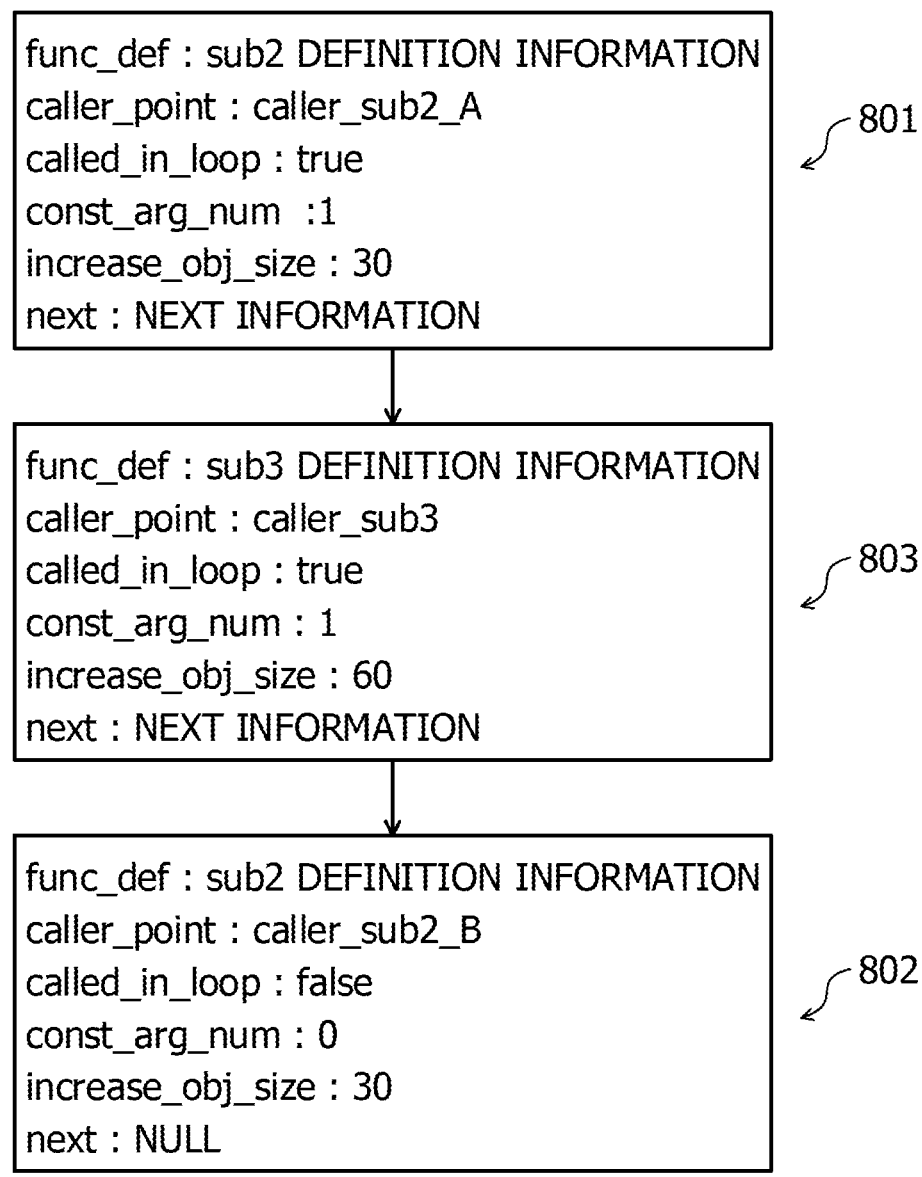
FIG. 9 illustrates exemplary program code conversion.

In FIG. 9, the information processing device 100 sorts info_list according to a designated rule. The designated rule includes, for example, a rule that a group A of function information info about functions called in a loop process is sorted in front of a group B of function information info about functions not called in a loop process. The designated rule includes a rule that the groups A and B are internally sorted in order of the largest number of constants designated as actual arguments. The designated rule includes a rule that if there are functions having the same number of constants designated as actual arguments internally in the groups A and B, the functions are sorted in order of the smallest increase in the size of the object code.

In info_list, the function information info for which called_in_loop is true corresponds to the function information 801 and 803. Therefore, the information processing device 100 registers the function information 801 and 803 in group A. The function information info for which called_in_loop is false corresponds to the function information 802. Therefore, the information processing device 100 registers the function information 802 in group B.

The information processing device 100 sorts the function information info registered in groups A and B in order of the largest const_arg_num. Herein, const_arg_num is equal for the function information 801 and 803 registered in group A. Therefore, the information processing device 100 does not have to sort group A. The function information 802 registered in group B is singular. Therefore, the information processing device 100 does not have to sort group B.

The information processing device 100 sorts the function information info registered in groups A and B in order of the smallest increase_obj_size. Herein, in group A, the increase_obj_size of the function information 801 is smaller than the increase_obj_size of the function information 803. Therefore, the information processing device 100 does not have to sort group A. The function information 802 registered in group B is singular. Therefore, the information processing device 100 does not have to sort group B.

The information processing device 100 adds the function information info registered in group A to a new function information list ordered_info_list, in order from the first function information info. After that, the information processing device 100 adds the function information info registered in group B to the new function information list ordered_info_list, in order from the first function information info.

With this arrangement, when converting functions, the information processing device 100 is able to use functions as conversion candidates while prioritizing functions which have been determined to be highly relevant to the improvement of the software execution performance, and which are less likely to increase the size of the object code.

Figure 10:
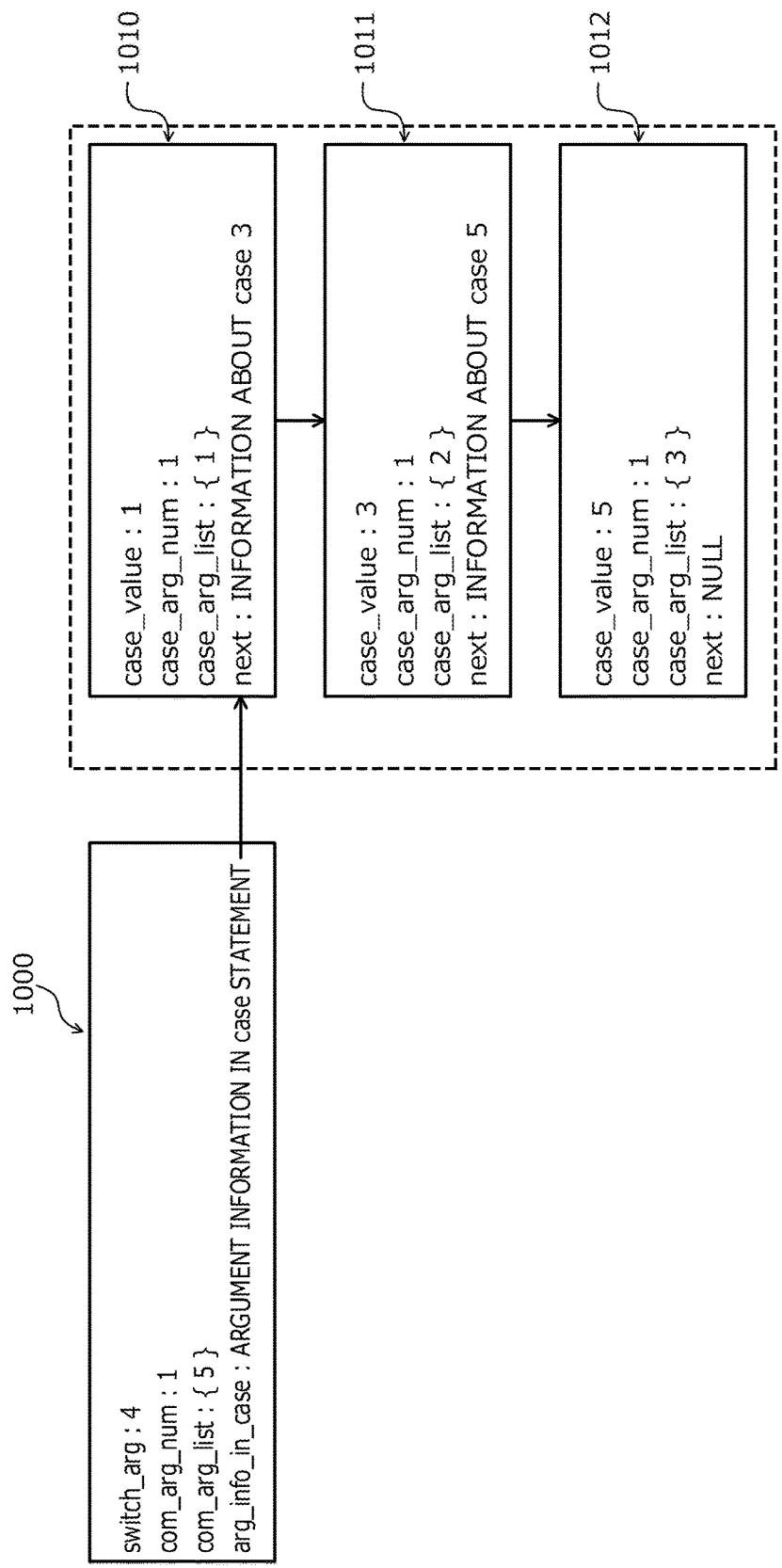
FIG. 10 illustrates exemplary program code conversion.

In FIG. 10, the information processing device 100 executes a functionalization process based on ordered_info_list. For example, suppose that the size before of the object code before executing the functionalization process is 200. The information processing device 100 sets 1.2 as a threshold value for restraining increases in the size of the object code.

The information processing device 100 prepares a variable sum in which is set the increase in the size of the object code when a function is converted, and also prepares a variable after in which is set the size of the object code when a function is converted. The information processing device 100 acquires the function information 801 at the beginning of the ordered_info_list. Based on the function information 801, the information processing device 100 executes the functionalization process on sub2.

The information processing device 100 sets "sum=30" based on the function information 801. The information processing device 100 sets "after=before+sum=200+30=230". The information processing device 100 computes "ratio=after/before=230/200=1.15". Herein, the information processing device 100 determines that "ratio<=threshold value". With this arrangement, the information processing device 100 determines that even if sub2 is converted, an increase in the size of the object code may be restrained.

The information processing device 100 collects argument information 1000 about sub2. For example, if there are less than four arguments, the arguments are passable through the register. Therefore, the information processing device 100 sets "max_arg_num=3" as the upper limit of the passable arguments.

Since there are five arguments of sub2, the information processing device 100 sets "arg_num_wo_switch=5−1=4". The information processing device 100 determines that "arg_num_wo_switch>max_arg_num". With this arrangement, the information processing device 100 determines that if "arg_num_wo_switch>max_arg_num", there is a possibility that conversion is desirable for sub2.

For example, the information processing device 100 determines that there is a possibility that conversion is desirable for sub2. The information processing device 100 executes a determination process of determining whether or not the arguments are passable through the register rather than the stack, even if the processing content of each case statement of sub2 is functionalized.

First, the information processing device 100 sets com_arg_num to 1, and sets a pointer to case statement information 1010 in arg_info_in_case. At this time, due to "case_arg_num=1", the information processing device 100 sets "need_arg_num=1+1=2", and determines that "need_arg_num<=max_arg_num". With this arrangement, the information processing device 100 determines that if "need_arg_num<=max_arg_num", the arguments of case statement 1 are passable through the register.

The information processing device 100 references case statement information 1011 based on next in the case statement information 1010, and similarly determines that "need_arg_num<=max_arg_num". With this arrangement, the information processing device 100 determines that if "need_arg_num<=max_arg_num", the arguments of case statement 3 are passable through the register.

The information processing device 100 references case statement information 1012 based on next in the case statement information 1011, and similarly determines that "need_arg_num<=max_arg_num". With this arrangement, the information processing device 100 determines that if "need_arg_num<=max_arg_num", the arguments of case statement 5 are passable through the register.

According to the above, the information processing device 100 determines whether or not the arguments are passable through the register rather than the stack, even if the processing content of each case statement of sub2 is functionalized. Therefore, the information processing device 100 sets the return value of the determination process to true.

Figure 11:
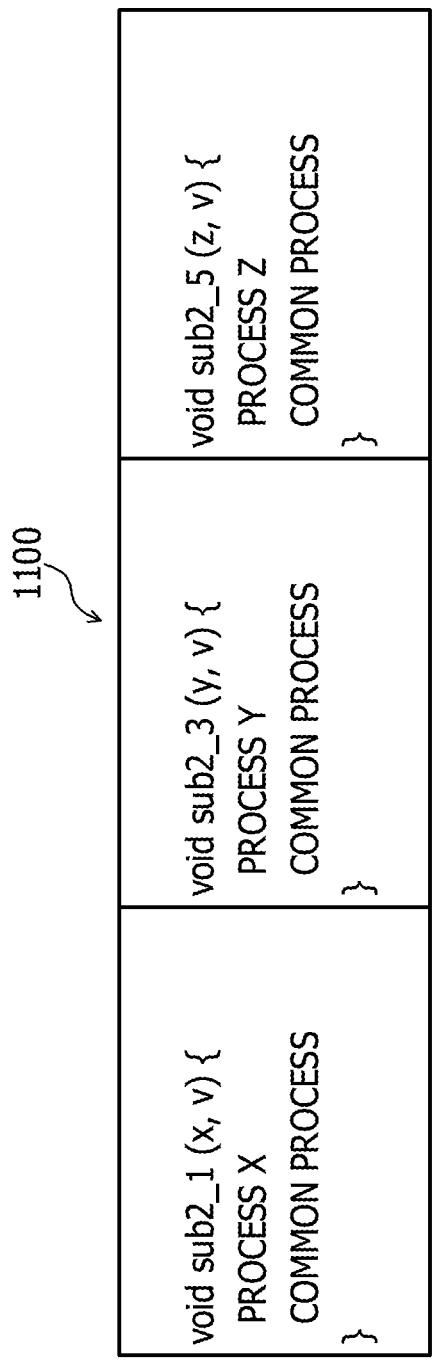
FIG. 11 illustrates exemplary program code conversion.

In FIG. 11, since the return value of the determination process is true, the information processing device 100 executes a function creation process for sub2-caller_sub2_A. Herein, sub2-caller_sub2_A indicates the combination of sub2 and the caller of sub2, namely caller_sub2_A.

Since the function creation target is sub2-caller_sub2_A, the information processing device 100 sets the sub2 definition information in def, and sets caller_sub2_A in caller_point. Also, the information processing device 100 sets com_arg_list to NULL, and sets case statement information 1011 in arg_info_in_case.

For example, the information processing device 100 prepares new_func_list. Herein, new_func_list is a list that holds functions corresponding to case statements created by the function creation process, and is empty by default.

Based on def, com_arg_list, and case_arg_list obtained from arg_info_in_case, the information processing device 100 collectively functionalizes the common process of sub2 and the processing content of each case statement. The information processing device 100 adds the created functions to new_func_list. In FIG. 11, new_func_list indicates a function group labeled 1100.

When the function creation process ends, the information processing device 100 substitutes caller_sub2_A in for the switch-case statement, based on def and caller_point. Based on new_func_list, the information processing device 100 substitutes the processing content of each case statement of sub2 with a call instruction to the functions obtained by functionalizing the processing content of each substituted case statement.

The information processing device 100 references the next case statement information 1011, and similarly sets "sum=30+60=90" and "after=200+90=290" with respect to sub3-caller_sub3. The information processing device 100 computes "ratio=290/200=1.45". Therefore, due to "ratio>threshold value", the information processing device 100 does not convert functions for sub3-caller_sub3.

The information processing device 100 references the next case statement information 1012, and similarly computes "ratio=260/200=1.3" for sub2-caller_sub2_B. Therefore, due to "ratio>threshold value", the information processing device 100 does not convert functions for sub2-caller_sub2_B. With this arrangement, the information processing device 100 is able to convert the program code 700.

Figure 12:
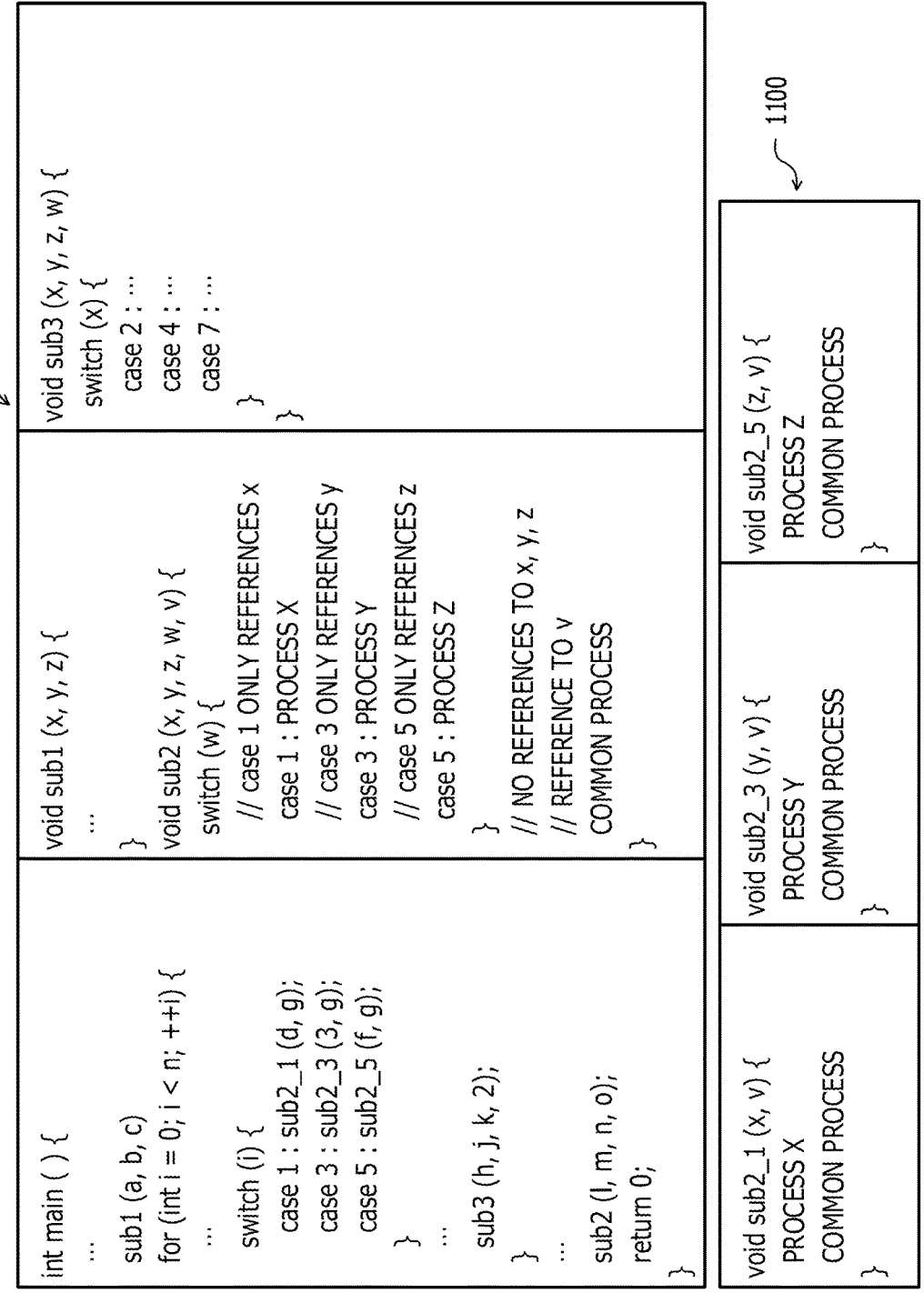
FIG. 12 illustrates exemplary converted program code.

FIG. 12 illustrates exemplary converted program code. The information processing device 100 converts the program code 700 illustrated in FIG. 7 to the program code 1200 illustrated in FIG. 12. In the hypothetical case of functionalizing all case statements in the program code 700, the increase in the size of the generated object code would become "30+30+60=120". On the other hand, in the case of converting the program code 700 to the program code 1200, the increase in the size of the generated object code becomes "30". Therefore, the information processing device 100 is able to restrain an increase in the size of the generated object code.

In the program code 1200, the information processing device 100 passes arguments through the register to improve argument access performance, and potentially improve the software execution performance. When functionalizing the processing content of a case statement, the information processing device 100 is able to delete dummy arguments not referenced in the case statement, and thereby potentially reduce the memory resources used when the arguments are passed.

Since the branch process of the switch-case statement is removed from the functions obtained by functionalizing the processing content of the case statements, the information processing device 100 is able to potentially simplify data dependence analysis. Therefore, the information processing device 100 is able to potentially make optimization more efficient, making it easier to improve the software execution performance. If there is a function which is not called in the converted program code, the information processing device 100 may also delete the function. If there is a function which is not called in the converted program code due to optimization, the information processing device 100 may also delete the function.

Figure 13:
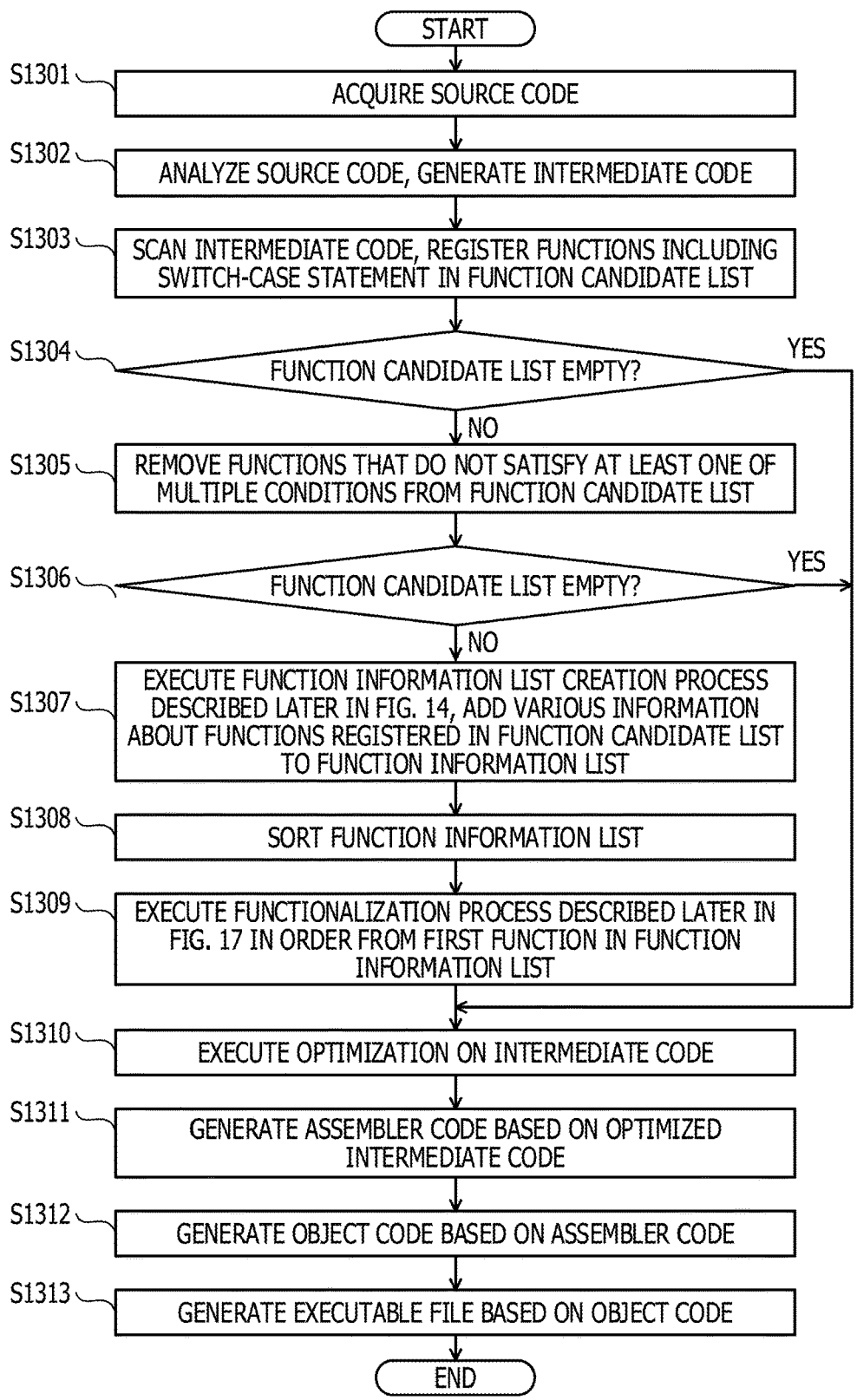
FIG. 13 illustrates an exemplary compiling process.

FIG. 13 illustrates an exemplary compiling process. In FIG. 13, the information processing device 100 acquires source code (step S1301).

The information processing device 100 analyzes the acquired source code, and generates intermediate code specific to the compiler (step S1302). Additionally, the information processing device 100 scans the generated intermediate code to search for functions including a switch-case statement, and registers the functions including a switch-case statement in a function candidate list (step S1303).

The information processing device 100 determines whether or not the function candidate list is empty (step S1304). If empty (step S1304: Yes), the information processing device 100 proceeds to the process in step S1310.

If not empty (step S1304: No), the information processing device 100 determines whether or not the functions registered in the function candidate list satisfy multiple conditions, and removes a function from the function candidate list if the function does not satisfy at least one condition (step S1305). The multiple conditions are the first to seventh conditions described earlier, for example.

The information processing device 100 determines whether or not the function candidate list is empty (step S1306). If empty (step S1306: Yes), the information processing device 100 proceeds to the process in step S1310.

If not empty (step S1306: No), the information processing device 100 executes a function information list creation process described later in FIG. 14, and adds various information about the functions registered in the function candidate list to the function information list (step S1307). The various information is information such as the caller of the function, whether or not the function is called in a loop process, the number of constants designated as actual arguments of the function, and the increase in the size of the object code in the case of functionalizing the processing content of case statements included in the function.

The information processing device 100 sorts the function information list in accordance with a designated rule (step S1308). The designated rule includes, for example, a rule that a group A of function information about functions called in a loop process is sorted in front of a group B of function information about functions not called in a loop process. The designated rule additionally includes a rule that the groups A and B are internally sorted in order of the largest number of constants designated as actual arguments. The designated rule additionally includes a rule that if there are functions having the same number of constants designated as actual arguments internally in the groups A and B, the functions are sorted in order of the smallest increase in the size of the object code.

The information processing device 100 executes the functionalization process described later in FIG. 17 in order from the first function in the function information list (step S1309). The functionalization process described later in FIG. 17 converts a function that includes a switch-case statement while restraining increases in the size of the generated object code, and potentially improves the software execution performance.

The information processing device 100 executes optimization on the intermediate code (step S1310). The information processing device 100 generates assembler code based on the optimized intermediate code (step S1311).

The information processing device 100 uses a linker to generate object code based on the generated assembler code (step S1312). The information processing device 100 generates an executable file based on the generated object code (step S1313). After that, the information processing device 100 ends the compiling process.

Figure 14:
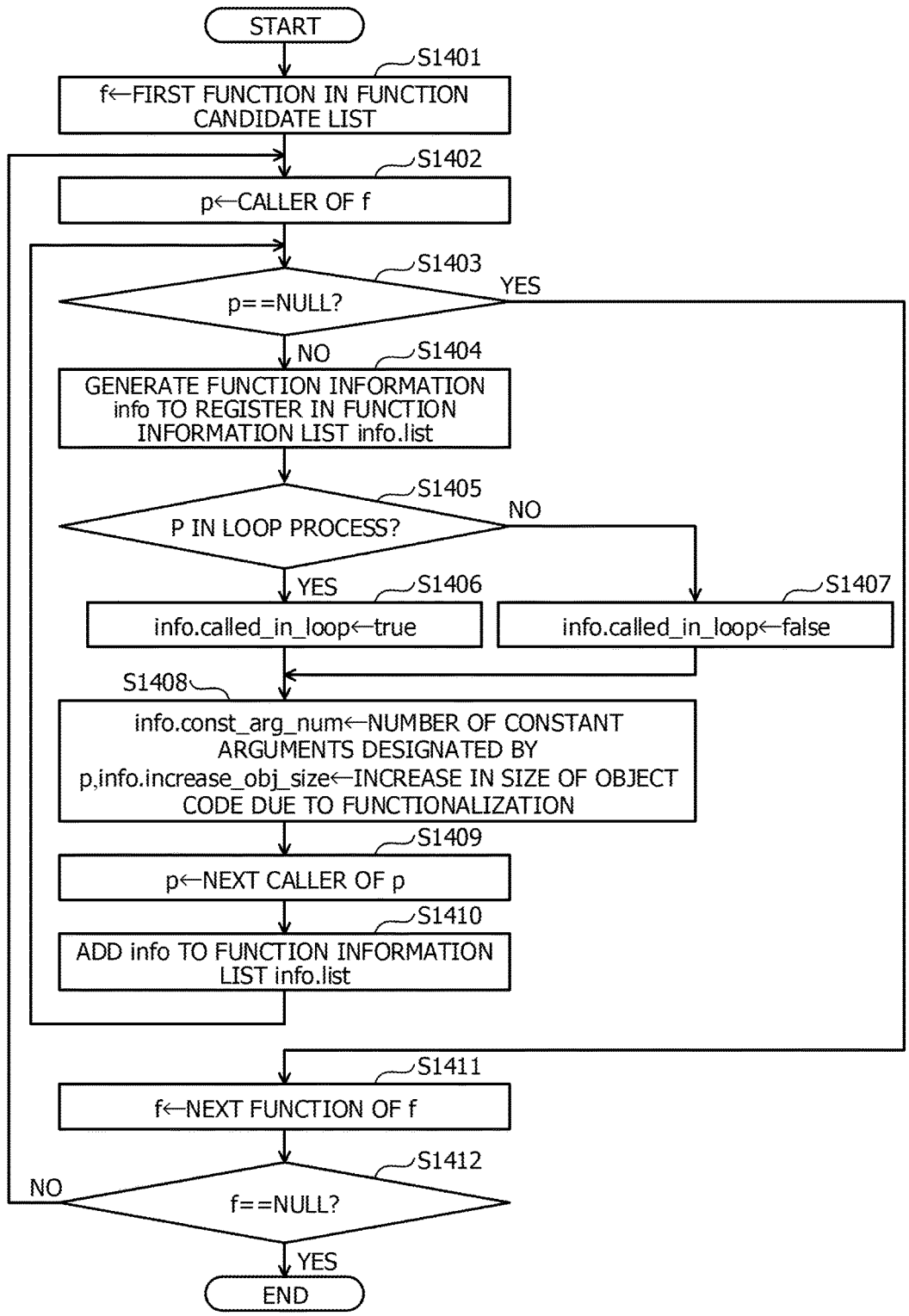
FIG. 14 illustrates an exemplary function information list creation process.

FIG. 14 illustrates an exemplary function information list creation process. In FIG. 14, the information processing device 100 sets f←the first function in the function candidate list (step S1401).

The information processing device 100 sets p←the caller of f (step S1402). The information processing device 100 determines whether or not p==NULL (step S1403). If p==NULL is true (step S1403: Yes), the information processing device 100 proceeds to the process in step S1411.

If p==NULL is not true (step S1403: No), the information processing device 100 generates function information info to register in the function information list info.list (step S1404).

The information processing device 100 determines whether or not p is in a loop process (step S1405). If p is in a loop process (step S1405: Yes), the information processing device 100 sets info.called_in_loop←true (step S1406). The information processing device 100 proceeds to the process in step S1408.

If p is not in a loop process (step S1405: No), the information processing device 100 sets info.called_in_loop←false (step S1407). The information processing device 100 proceeds to the process in step S1408.

In step S1408, the information processing device 100 uses the size computation process described later in FIG. 15 or FIG. 16 to compute the increase in the size of the object code due to functionalization. The information processing device 100 sets info.const_arg_num←the number of constant arguments designated by p, and sets info.increase_obj_size←the increase in the size of the object code due to functionalization (step S1408).

The information processing device 100 sets p←the next caller of p (step S1409). The information processing device 100 adds the function information info to the function information list info.list (step S1410). After that, the information processing device 100 returns to the process in step S1403.

In step S1411, the information processing device 100 sets f←the next function off (step S1411). The information processing device 100 determines whether or not f==NULL (step S1412). If f==NULL is not true (step S1412: No), the information processing device 100 returns to the process in step S1402.

If f==NULL is true (step S1412: Yes), the information processing device 100 ends the function information list creation process.

Figure 15:
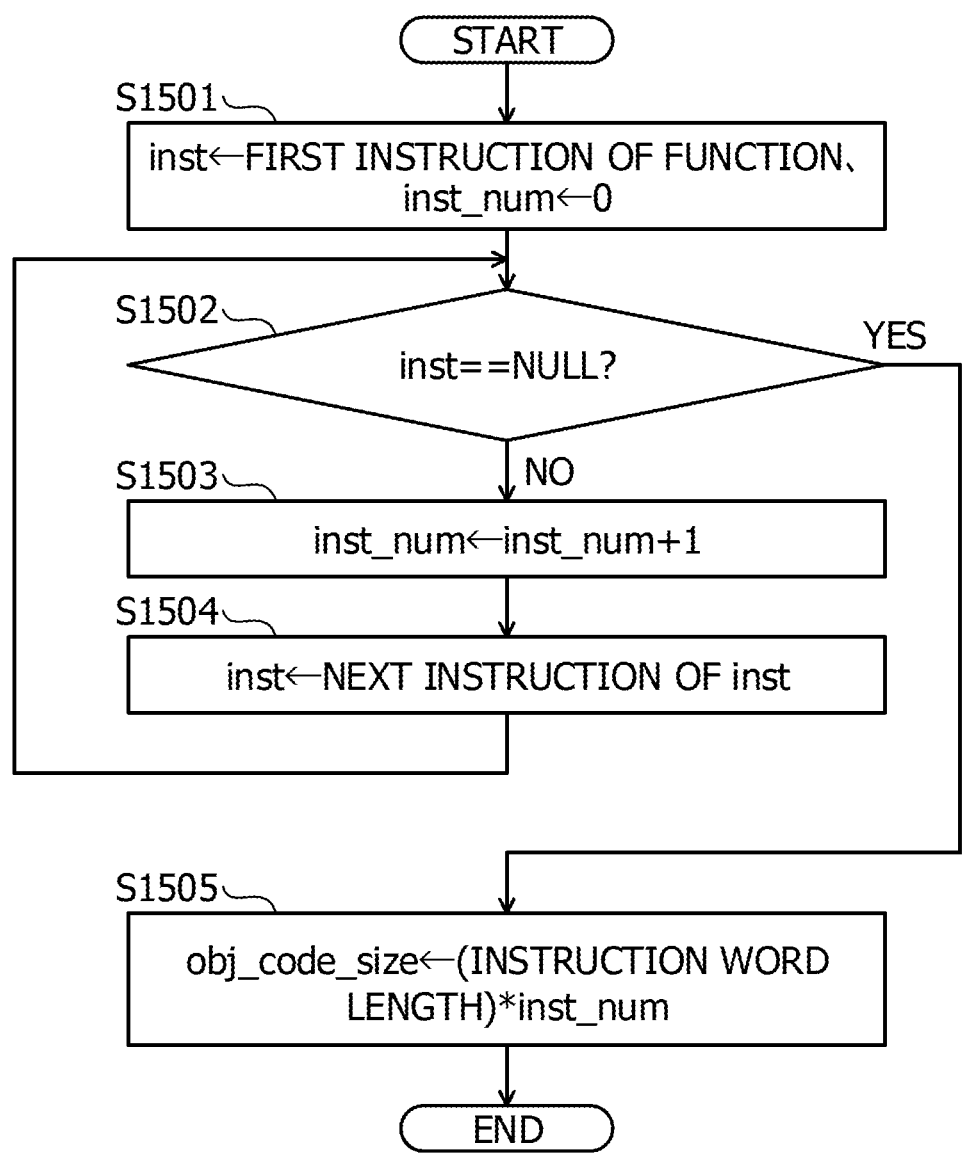
FIG. 15 illustrates an exemplary size computation process.

FIG. 15 illustrates an exemplary size computation process. In FIG. 15, the information processing device 100 sets inst←the first instruction of the function, and sets inst_num←0 (step S1501).

The information processing device 100 determines whether or not inst==NULL (step S1502). Herein, if inst==NULL is not true (step S1502: No), the information processing device 100 sets inst_num←inst_num+1 (step S1503). The information processing device 100 sets inst←the next instruction of inst (step S1504). The information processing device 100 returns to the process in step S1502.

If inst==NULL is true (step S1502: Yes), the information processing device 100 sets obj_code_size←(instruction word length)*inst_num (step S1505). The information processing device 100 ends the size computation process.

Figure 16:
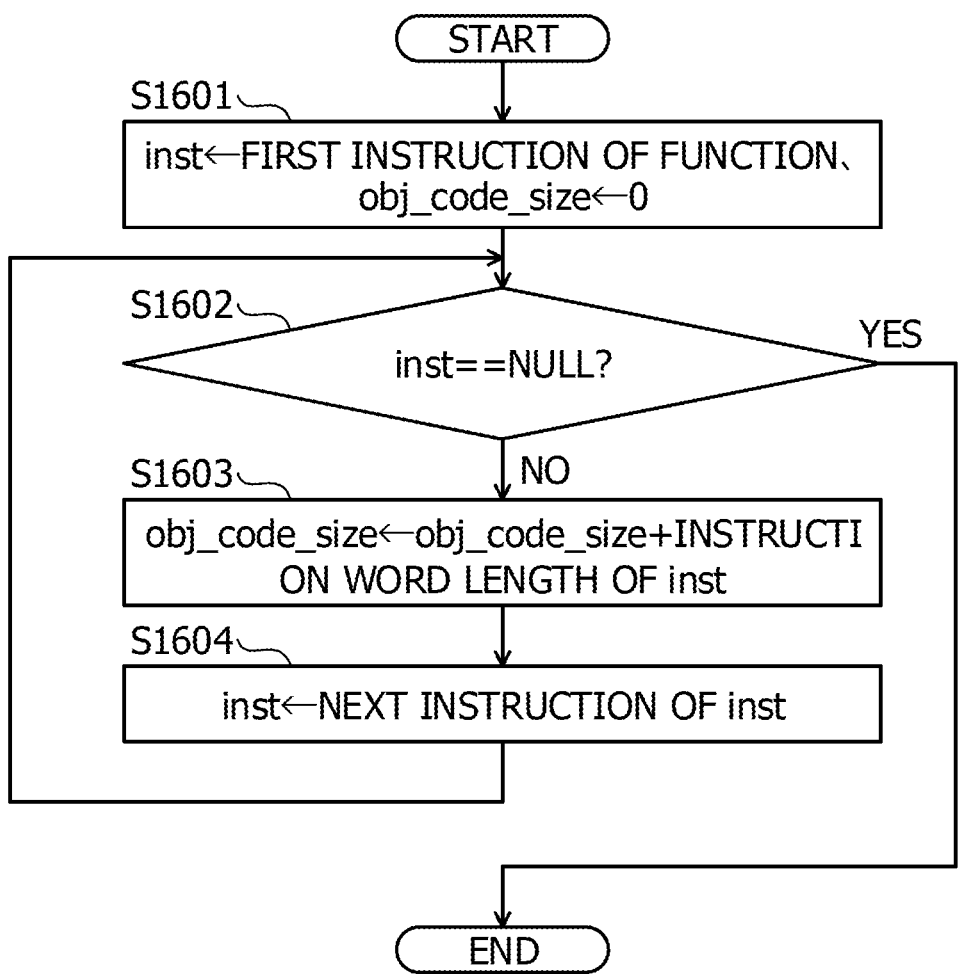
FIG. 16 illustrates an exemplary size computation process.

FIG. 16 illustrates an exemplary size computation process. In FIG. 16, the information processing device 100 sets inst←the first instruction of the function, and sets obj_code_size←0 (step S1601).

The information processing device 100 determines whether or not inst==NULL (step S1602). Herein, if inst==NULL is not true (step S1602: No), the information processing device 100 sets obj_code_size←obj_code_size+ the instruction word length of inst (step S1603). The information processing device 100 sets inst←the next instruction of inst (step S1604). The information processing device 100 returns to the process in step S1602.

If inst==NULL is true (step S1602: Yes), the information processing device 100 ends the size computation process.

Figure 17:
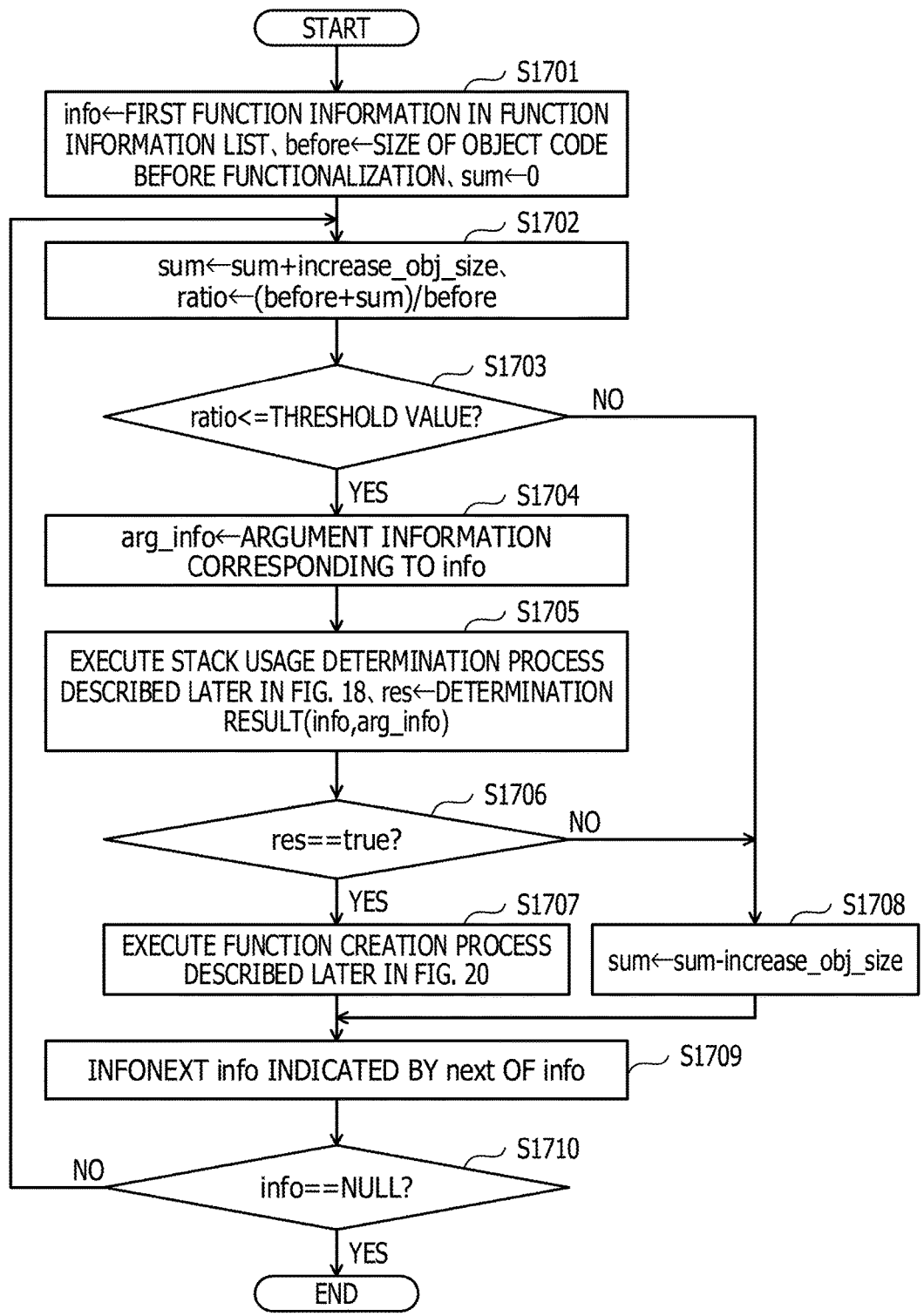
FIG. 17 illustrates an exemplary functionalization process.

FIG. 17 illustrates an exemplary functionalization process. In FIG. 17, the information processing device 100 sets info←the first function information in the function information list, sets before←the size of the object code before functionalization, and sets sum←0 (step S1701).

The information processing device 100 sets sum←sum+ increase_obj_size, and sets ratio←(before+sum)/before (step S1702). The information processing device 100 determines whether or not ratio<=threshold value (step S1703). If ratio<=threshold value is not true (step S1703: No), the information processing device 100 proceeds to the process in step S1708.

If ratio<=threshold value (step S1703: Yes), the information processing device 100 acquires argument information corresponding to info, and sets arg_info←the argument information corresponding to info (step S1704).

Next, the information processing device 100 executes a stack usage determination process described later in FIG. 18, and sets res←determination result (info, arg_info) (step S1705). The information processing device 100 determines whether or not res==true (step S1706). If res==true is true (step S1706: Yes), the information processing device 100 executes a function creation process described later in FIG. 20 (step S1707). The information processing device 100 proceeds to the process in step S1709.

If res==true is not true (step S1706: No), the information processing device 100 sets sum←sum-increase_obj_size (step S1708). The information processing device 100 proceeds to the process in step S1709.

In step S1709, the information processing device 100 sets info←the next info indicated by next in info (step S1709). The information processing device 100 determines whether or not info==NULL (step S1710). If info==NULL is not true (step S1710: No), the information processing device 100 returns to the process in step S1702.

If info==NULL is true (step S1710: Yes), the information processing device 100 ends the functionalization process.

Figure 18:
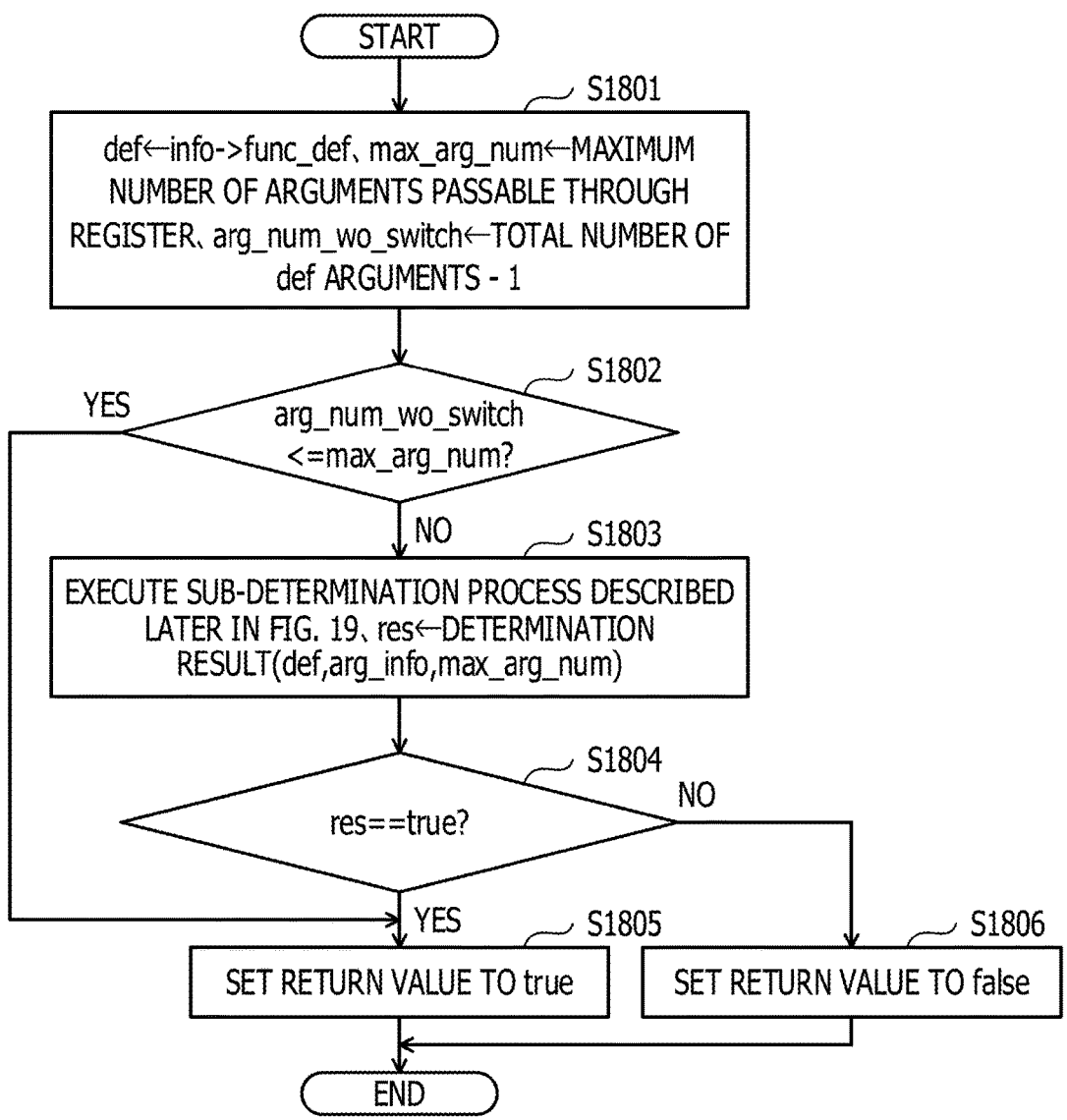
FIG. 18 illustrates an exemplary stack usage determination process.

FIG. 18 illustrates an exemplary stack usage determination process. In FIG. 18, the information processing device 100 sets def←info->func_def, sets max_arg_num←the maximum number of arguments passable through the register, and sets arg_num_wo_switch←the total number of def arguments−1 (step S1801).

The information processing device 100 determines whether or not arg_num_wo_switch<=max_arg_num (step S1802). If arg_num_wo_switch<=max_arg_num is true (step S1802: Yes), the information processing device 100 proceeds to the process in step S1805.

If arg_num_wo_switch<=max_arg_num is not true (step S1802: No), the information processing device 100 executes a sub-determination process described later in FIG. 19. The information processing device 100 sets res←determination result (def, arg_info, max_arg_num) (step S1803).

The information processing device 100 determines whether or not res==true (step S1804). If res==true is true (step S1804: Yes), the information processing device 100 sets the return value to true (step S1805). The information processing device 100 ends the stage usage determination process.

If res==true is not true (step S1804: No), the information processing device 100 sets the return value to false (step S1806). The information processing device 100 ends the stage usage determination process.

Figure 19:
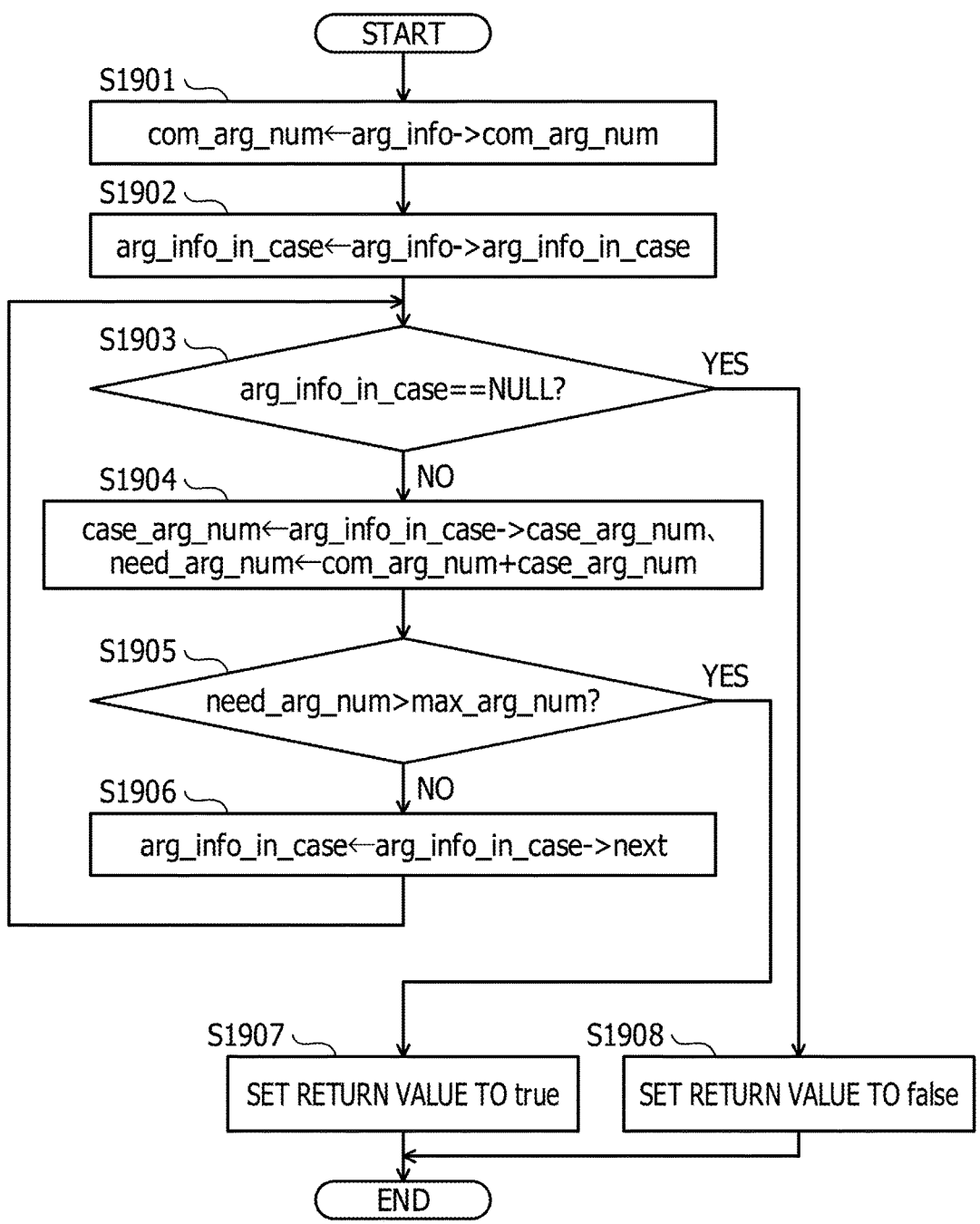
FIG. 19 illustrates an exemplary sub usage determination process.

FIG. 19 illustrates an exemplary sub usage determination process. In FIG. 19, the information processing device 100 sets com_arg_num←arg_info->com_arg_num (step S1901).

The information processing device 100 sets arg_info_in_case←arg_info->arg_info_in_case (step S1902). The information processing device 100 determines whether or not arg_info_in_case==NULL (step S1903). If arg_info_in_case==NULL is true (step S1903: Yes), the information processing device 100 proceeds to the process in step S1908.

If arg_info_in_case==NULL is not true (step S1903: No), the information processing device 100 sets case_arg_nu-m←arg_info_in_case->case_arg_num, and sets need_arg_num←com_arg_num+case_arg_num (step S1904).

The information processing device 100 determines whether or not need_arg_num>max_arg_num (step S1905). If need_arg_num>max_arg_num is true (step S1905: Yes), the information processing device 100 proceeds to the process in step S1907.

If need_arg_num>max_arg_num is not true (step S1905: No), the information processing device 100 sets arg_info_in_case←arg_info_in_case->next (step S1906). The information processing device 100 returns to the process in step S1903.

In step S1907, the information processing device 100 sets the return value to false (step S1907). The information processing device 100 ends the sub-determination process.

In step S1908, the information processing device 100 sets the return value to true (step S1908). The information processing device 100 ends the sub-determination process.

Figure 20:
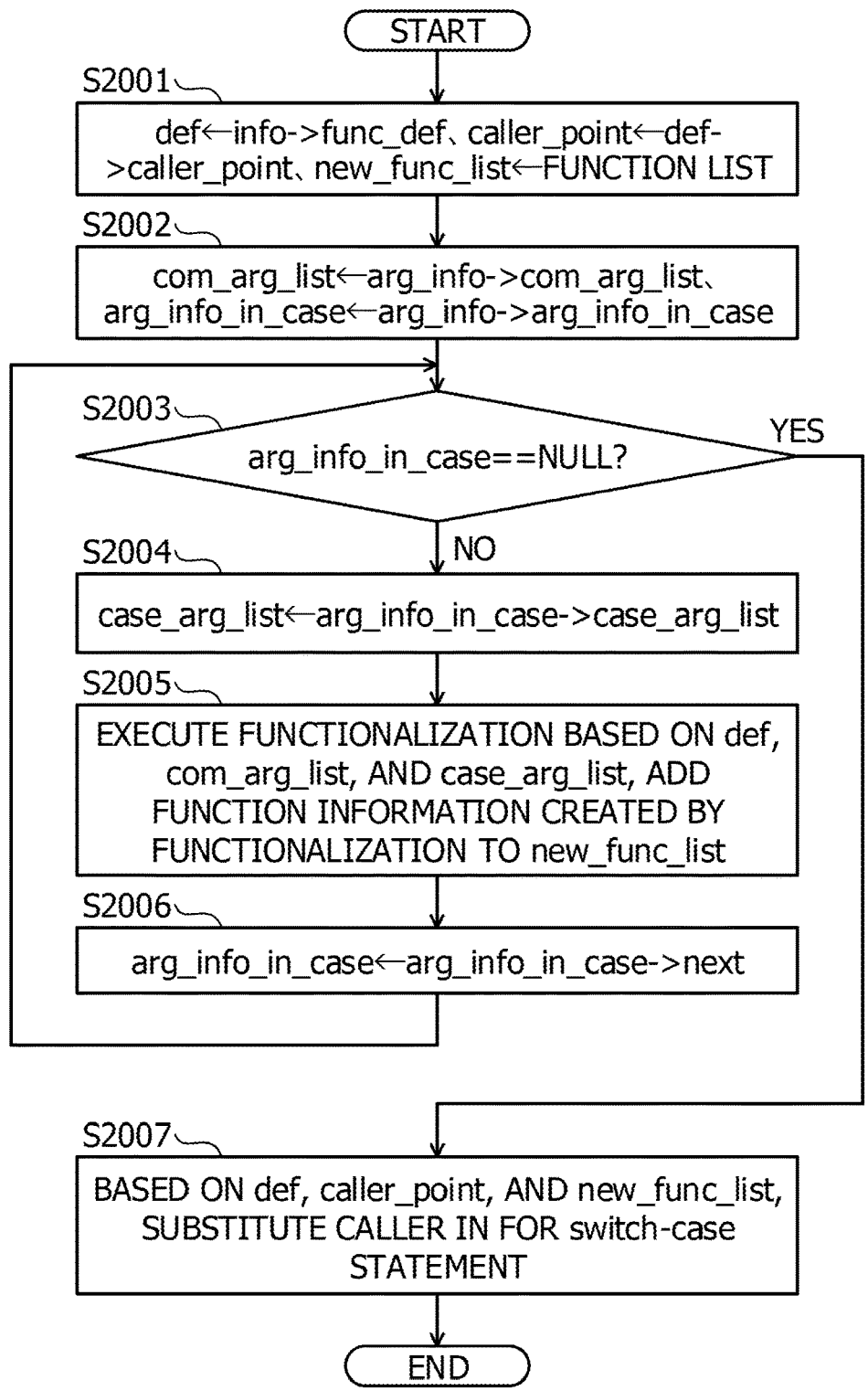
FIG. 20 illustrates an exemplary function creation process.

FIG. 20 illustrates an exemplary function creation processing procedure. In FIG. 20, the information processing device 100 sets def←info->func_def, sets caller_point←def->caller_point, and sets new_func_list←the function list (step S2001).

The information processing device 100 sets com_arg_list←arg_info->com_arg_list, and sets arg_info_in_case←arg_info->arg_info_in_case (step S2002).

The information processing device 100 determines whether or not arg_info_in_case==NULL (step S2003). If arg_info_in_case==NULL is true (step S2003: Yes), the information processing device 100 proceeds to the process in step S2007.

If arg_info_in_case==NULL is not true (step S2003: No), the information processing device 100 sets case_arg_list←arg_info_in_case->case_arg_list (step S2004).

The information processing device 100 executes functionalization based on def, com_arg_list, and case_arg_list, and adds the function information created by functionalization to new_func_list (step S2005).

The information processing device 100 sets arg_info_in_case←arg_info_in_case->next (step S2006). After that, the information processing device 100 returns to the process in step S2003.

In step S2007, the information processing device 100 substitutes the caller in for switch-case statement, based on def, caller_point, and new_func_list (step S2007). Subsequently, the information processing device 100 ends the function creation process.

As described above, according to the information processing device 100, a function including a branch instruction in the program code is specified. According to the information processing device 100, based on the number of arguments referenced in a branch of the branch instruction included in the specified function, it is determined whether or not the arguments of a function obtained by functionalizing a branch are passable through the register. According to the information processing device 100, in the case of determining that the arguments are passable, the specified function is converted by using functions obtained by functionalizing each branch of the branch instruction, whereas in the case of determining that the arguments are not passable, the specified function is not converted. With this arrangement, in the information processing device 100, the software execution performance is potentially improved.

According to the information processing device 100, a function including a branch instruction in the program code is specified. According to the information processing device 100, based on the number of arguments referenced in each branch of the branch instruction included in the specified function, it is determined whether or not the arguments of each function obtained by functionalizing a branch are passable through the register. According to the information processing device 100, in the case of determining that the arguments are passable, the specified function is converted by using functions obtained by functionalizing each branch, whereas in the case of determining that the arguments are not passable, the specified function is not converted. With this arrangement, in the information processing device 100, the software execution performance is potentially improved.

According to the information processing device 100, a function containing an argument which is not referenced in each of the branch, but is referenced in the branch determination of the branch instruction, is specified. With this arrangement, the information processing device 100 potentially improves the software execution performance by treating a function relevant to the improvement of the software execution performance as a conversion candidate. There is a reduction in the occurrence of increased processing load due to the information processing device 100 treating a function judged to have little relevance to the improvement of the software execution performance as a conversion candidate.

According to the information processing device 100, a function whose caller exists inside the same translation unit is specified. With this arrangement, there is a reduction in the occurrence of increased processing load due to the information processing device 100 treating an unconvertible function as a conversion candidate.

According to the information processing device 100, a function which is not called recursively is specified. With this arrangement, there is a reduction in the occurrence of increased processing load due to the information processing device 100 treating an unconvertible function as a conversion candidate.

According to the information processing device 100, a function that does not call a user-defined function is specified. With this arrangement, there is a reduction in the occurrence of increased processing load due to the information processing device 100 treating an unconvertible function as a conversion candidate.

According to the information processing device 100, a function that does include exception handling is specified. With this arrangement, there is a reduction in the occurrence of increased processing load due to the information processing device 100 treating an unconvertible function as a conversion candidate.

According to the information processing device 100, a function having a number of instructions which is a threshold value or less is specified. With this arrangement, there is a reduction in the occurrence of the object code increasing by a fixed amount or greater due to the information processing device 100 converting a function having a number of instructions which is greater than a threshold value. There is a reduction in the occurrence of increased processing load due to the information processing device 100 treating, as a conversion candidate, a function which, if converted, is determined to cause the size of the object code to increase by a fixed amount or greater.

According to the information processing device 100, a function in which at least a subset of the arguments is passed through the stack is specified. With this arrangement, the information processing device 100 converts a function in which at least a subset of the arguments is passed through the stack, thereby causing the subset of the arguments to go through the register instead of going through the stack, restraining an increase in the access times to the subset of the arguments, and potentially improving the software execution performance. There is a reduction in the occurrence of increased processing load due to the information processing device 100 treating, as a conversion candidate, a function whose arguments are passed through the register, which is judged to have little relevance to the improvement of the software execution performance.

According to the information processing device 100, from the size of the object code based on the program code, an index value indicating the degree of increase in the size of the object code based on the program code in the case of converting the specified function is computed. According to the information processing device 100, in the case in which the computed index value is a threshold value or greater, the specified function is not converted. With this arrangement, in the information processing device 100, increases in the size of the object code are reduced.

According to the information processing device 100, multiple functions including a branch instruction in the program code may be specified. According to the information processing device 100, the multiple specified functions may be selected sequentially so that a function called in a loop process is selected first, and a function not called in a loop process is selected last. According to the information processing device 100, every time a function is selected, from the size of the object code based on the program code, an index value indicating the degree of increase in the size of the object code based on the program code in the case of converting the selected function is computed. According to the information processing device 100, functions among the multiple specified functions for which the computed index value is a threshold value or greater are not converted. With this arrangement, the information processing device 100 decides whether or not to convert functions in order of the functions which are highly relevant to the improvement of the software execution performance while also restraining increases in the size of the object code, thereby potentially improving the software execution performance efficiently.

According to the information processing device 100, the multiple specified functions are selected sequentially in order of the largest number of constants designated as arguments. With this arrangement, the information processing device 100 decides whether or not to convert functions in order of the functions which are highly relevant to the improvement of the software execution performance while also restraining increases in the size of the object code, thereby potentially improving the software execution performance efficiently.

According to the information processing device 100, for every specified function, the increase in the size of the object code based on the program code is computed for the case of using the functions obtained by functionalizing each branch of the branch instruction included in the function to convert the function. According to the information processing device 100, the multiple specified functions are selected in order of the functions having the smallest computed increase. With this arrangement, the information processing device 100 decides whether or not to convert functions in order of the functions for which increases in the size of the object code are easily restrained, thereby restraining increases in the size of the object code efficiently.

According to the information processing device 100, a specified function is not converted in the case in which the size of the object code based on the program code in the case of converting the specified function using the functions obtained by functionalizing each branch is a threshold value or greater. With this arrangement, the information processing device 100 reduces increases in the size of the object code.

The above compiler method may be realized by a computer such as a personal computer or a workstation executing a prepared program. The above compiler program is executed by being recorded onto a computer-readable recording medium such as a hard disk, flexible disk, CD-ROM, MO, or DVD, and by being retrieved from the recording medium by the computer. Also, the above compiler program may be distributed over a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing device comprising:
a memory; and
a processor coupled to the memory,
the processor
specifies a function including a branch instruction including one or more branch destinations in a program code;
determines, based on a first number of arguments which are referenced in one branch destination among the one or more branch destinations, whether or not an argument of one function obtained by functionalizing the one branch destination are passable through a register; and
converts, when determining to be passable, the specified function using one or more functions obtained by functionalizing the one or more branch destinations and does not convert, when determining not to be passable, the specified function.

2. The information processing device according to claim 1, wherein
the processor:
determines, based on a second number of arguments which are referenced in the one or more branch destinations, whether or not the arguments of the one or more functions are passable through the register; and
converts, when determining to be passable, the specified function using the one or more functions and does not convert, when determining not to be passable, the specified function.

3. The information processing device according to claim 1, wherein
the specified function is a function containing an argument which is not referenced in the one or more branch destinations and is referenced in a branch determination of the branch instruction.

4. The information processing device according to claim 1, wherein
the specified function is a function whose caller exists inside the same translation unit.

5. The information processing device according to claim 1, wherein
the specified function is a function which is not called recursively.

6. The information processing device according to claim 1, wherein
the specified function is a function that does not call a user-defined function.

7. The information processing device according to claim 1, wherein
the specified function is a function that does not include exception handling.

8. The information processing device according to claim 1, wherein
the specified function is a function whose number of instructions is a threshold value or less.

9. The information processing device according to claim 1, wherein
the specified function is a function in which at least one argument of the specified function are passed through a stack.

10. The information processing device according to claim 1, wherein
the processor:
computes, from a size of an object code based on the program code, an index value indicating a degree of increase in the size of the object code based on the program code in a case of converting the specified function using the one or more functions; and
does not convert the specified function when the index value is a threshold value or greater.

11. The information processing device according to claim 1, wherein
the processor:
specifies multiple functions including a branch instruction in the program code;
sequentially selects the multiple specified functions in such a manner that a function which is called in a loop process is selected earlier, and a function which is not called in a loop process is selected later;
computes, for each selection, from a size of an object code based on the program code, an index value indicating a degree of increase in the size of the object code based on the program code in a case of converting the selected function using functions obtained by functionalizing each branch destination of one or more branch instructions included in the selected function and
does not convert a function, among the specified multiple functions, having the index value which is a threshold value or greater.

12. The information processing device according to claim 11, wherein
the processor sequentially selects the multiple specified functions in descending order of a number of constants which are designated as arguments.

13. The information processing device according to claim 11, wherein
the processor:
computes, for each of the multiple specified functions, computes an increase in the size of the object code based on the program code in a case of converting, using functions obtained by functionalizing each branch destination of the one or more branch instructions included in the multiple specified functions; and
sequentially selects the specified multiple functions in ascending order of the increase.

14. The information processing device according to claim 1, wherein
the processor does not convert the specified function when a size of object code based on the program code in a case of converting the specified function using the one or more functions is a threshold value or greater.

15. A compiler method comprising:

specifying, by a computer, a function including a branch instruction including one or more branch destinations in a program code;

determining, based on a first number of arguments which are referenced in one branch destination among the one or more branch destinations, whether or not an argument of one function obtained by functionalizing the one branch destination are passable through a register; and converting, when determining to be passable, the specified function using one or more functions obtained by functionalizing the one or more branch destinations and does not convert, when determining not to be passable, the specified function.

16. The compiler method according to claim 15, further comprising:

determining, based on a second number of arguments which are referenced in the one or more branch destinations, whether or not the arguments of the one or more functions are passable through the register; and converting, when determining to be passable, the specified function using the one or more functions and does not convert, when determining not to be passable, the specified function.

17. The compiler method according to claim 15, wherein the specified function is a function containing an argument which is not referenced in the one or more branch destinations and is referenced in a branch determination of the branch instruction.

18. A non-transitory computer-readable recording medium recording a compiler program which causes a computer to perform a process, the process comprising:

specifying a function including a branch instruction including one or more branch destinations in a program code;

determining, based on a first number of arguments which are referenced in one branch destination among the one or more branch destinations, whether or not an argument of one function obtained by functionalizing the one branch destination are passable through a register; and converting, when determining to be passable, the specified function using one or more functions obtained by functionalizing the one or more branch destinations and does not convert, when determining not to be passable, the specified function.

19. The non-transitory computer-readable recording medium according to claim 18, further comprising:

determining, based on a second number of arguments which are referenced in the one or more branch destinations, whether or not the arguments of the one or more functions are passable through the register; and converting, when determining to be passable, the specified function using the one or more functions and does not convert, when determining not to be passable, the specified function.

20. The non-transitory computer-readable recording medium according to claim 18, wherein the specified function is a function containing an argument which is not referenced in the one or more branch destinations and is referenced in a branch determination of the branch instruction.

* * * * *